United States Patent
Choi et al.

(10) Patent No.: US 9,416,317 B2
(45) Date of Patent: Aug. 16, 2016

(54) POLYMERIZABLE LIQUID CRYSTAL COMPOUND, POLYMERIZABLE LIQUID CRYSTAL COMPOSITION, AND OPTICAL ANISOTROPIC BODY

(71) Applicant: LG Chem, Ltd., Seoul (KR)

(72) Inventors: Dai Seung Choi, Daejeon (KR); Sung-Ho Chun, Daejeon (KR); Dong-Woo Yoo, Daejeon (KR); Mi Ra Hong, Daejeon (KR); Kyung Chang Seo, Daejeon (KR); Hyeong Bin Jang, Daejeon (KR); Jung Hyun Kim, Daejeon (KR); Min Hyung Lee, Daejeon (KR); Eun Seok Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/821,370

(22) Filed: Aug. 7, 2015

(65) Prior Publication Data

US 2016/0024385 A1 Jan. 28, 2016

Related U.S. Application Data

(63) Continuation of application No. 14/391,326, filed as application No. PCT/KR2013/003346 on Apr. 19, 2013, now Pat. No. 9,206,355.

(30) Foreign Application Priority Data

Apr. 20, 2012 (KR) .................. 10-2012-0041780
Apr. 19, 2013 (KR) .................. 10-2013-0043281

(51) Int. Cl.
| | |
|---|---|
| *C09K 19/20* | (2006.01) |
| *C09K 19/30* | (2006.01) |
| *C09K 19/32* | (2006.01) |
| *C09K 19/34* | (2006.01) |
| *C09K 19/38* | (2006.01) |
| *G02F 1/1337* | (2006.01) |
| *G02F 1/1333* | (2006.01) |
| *G02B 5/30* | (2006.01) |
| *C08G 61/00* | (2006.01) |
| *C09K 19/46* | (2006.01) |
| *C08F 22/20* | (2006.01) |
| *C08F 34/04* | (2006.01) |
| *C09K 19/04* | (2006.01) |
| *C09K 19/12* | (2006.01) |

(52) U.S. Cl.
CPC .............. *C09K 19/46* (2013.01); *C08F 22/20* (2013.01); *C08F 34/04* (2013.01); *C09K 19/2007* (2013.01); *C09K 19/3068* (2013.01); *C09K 19/322* (2013.01); *C09K 19/3491* (2013.01); *C09K 19/3809* (2013.01); *G02B 5/305* (2013.01); *G02F 1/133365* (2013.01); *G02F 1/133784* (2013.01); *G02F 1/133788* (2013.01); *C08G 2261/226* (2013.01); *C08G 2261/3422* (2013.01); *C08G 2261/413* (2013.01); *C08G 2261/53* (2013.01); *C08G 2261/74* (2013.01); *C09K 19/38* (2013.01); *C09K 2019/0444* (2013.01); *C09K 2019/0448* (2013.01); *C09K 2019/122* (2013.01); *C09K 2019/2035* (2013.01); *C09K 2019/3075* (2013.01); *C09K 2019/3077* (2013.01); *C09K 2019/3083* (2013.01)

(58) Field of Classification Search
CPC .......... C09K 19/2007; C09K 19/2014; C09K 19/3068; C09K 19/322; C09K 19/3491; C09K 19/3497; C09K 19/38; C09K 2019/0444; C09K 2019/0448; C09K 2019/122; C09K 2019/2035; C09K 2019/3075; C09K 2019/3077; C09K 2019/3083; C09K 2019/3809; G02F 1/133784; G02F 1/133788; G02F 1/133365; G02B 5/3016; G02B 5/305; C08G 2261/3422; C08G 2261/53

See application file for complete search history.

(56) References Cited

U.S. PATENT DOCUMENTS

| | | | |
|---|---|---|---|
| 6,139,771 A | 10/2000 | Walba et al. | |
| 6,203,724 B1 | 3/2001 | Reiffenrath et al. | |

(Continued)

FOREIGN PATENT DOCUMENTS

| | | |
|---|---|---|
| CN | 101796163 A | 8/2010 |
| CN | 101809119 A | 8/2010 |

(Continued)

OTHER PUBLICATIONS

U.S. Appl. No. 14/391,326, filed Oct. 8, 2014.

*Primary Examiner* — Shean C Wu
(74) *Attorney, Agent, or Firm* — Dentons US LLP

(57) ABSTRACT

The present description relates to a polymerizable liquid crystal compound, a polymerizable liquid crystal composition including the same, and an optically anisotropic body. The polymerizable liquid crystal compound includes a radical derived from the first liquid crystal molecule including a mesogen group having a non-aromatic ring; a radical derived from the second liquid crystal molecule including a mesogen group that has a structure different from said mesogen group having a non-aromatic ring and includes a ring containing a double bond; and a linker that has a specific structure and links the sp3-hybridized carbon in the non-aromatic ring of the radical derived from the first liquid crystal molecule and the sp2-hybridized carbon in the mesogen group of the radical derived from the second liquid crystal molecule, wherein at least one of the radicals derived from the first and the second liquid crystal molecules may include one or more polymerizable groups which are connected to the mesogen group directly or via spacer groups. Such polymerizable liquid crystal compound makes it possible to exhibit stable reverse wavelength dispersion solely or by being mixed with other liquid crystal materials.

9 Claims, 4 Drawing Sheets

(56) References Cited

U.S. PATENT DOCUMENTS

| | | |
|---|---|---|
| 6,749,771 B1 | 6/2004 | Cherkaoui et al. |
| 8,119,026 B2 | 2/2012 | Parri et al. |
| 8,252,389 B2 | 8/2012 | Adlem et al. |
| 8,289,494 B2 | 10/2012 | Parri et al. |
| 9,206,355 B2 * | 12/2015 | Choi ................. G02F 1/133784 |
| 2005/0012070 A1 | 1/2005 | Inoue et al. |
| 2010/0222534 A1 | 9/2010 | Adlem et al. |
| 2011/0147659 A1 | 6/2011 | Adlem et al. |

FOREIGN PATENT DOCUMENTS

| | | |
|---|---|---|
| CN | 102124078 A | 7/2011 |
| JP | 10068816 A | 3/1998 |
| JP | 10090521 A | 4/1998 |
| JP | 11052131 A | 2/1999 |
| JP | 2000002841 A | 1/2000 |
| JP | 2000169403 A | 6/2000 |
| JP | 2002267838 A | 9/2002 |
| JP | 200515473 A | 1/2005 |
| JP | 2010522893 A | 7/2010 |
| JP | 2010540472 A | 12/2010 |
| JP | 2011042606 A | 3/2011 |
| KR | 20100016054 A | 2/2010 |
| KR | 102010085929 A | 7/2010 |
| KR | 20100098036 A | 9/2010 |
| KR | 101106528 B1 | 1/2012 |
| TW | 200907029 A | 2/2009 |
| WO | 0002675 A1 | 1/2000 |
| WO | 2010/098594 A2 | 9/2010 |
| WO | 2011050896 A1 | 5/2011 |

* cited by examiner

POLYMERIZABLE LIQUID CRYSTAL COMPOUND, POLYMERIZABLE LIQUID CRYSTAL COMPOSITION, AND OPTICAL ANISOTROPIC BODY

This application is a continuation application of Ser. No. 14/391,326, filed Oct. 8, 2014, which is a national phase entry of International Application No. PCT/KR2013/003346 filed on Apr. 19, 2013, which claims priority to Korean Patent Application No. 10-2012-0041780, filed on Apr. 20, 2012, and Korean Patent Application No. 10-2013-0043281, filed on Apr. 19, 2013, all of which are hereby incorporated by reference for all purposes as if fully set forth herein.

TECHNICAL FIELD

The present description relates to a polymerizable liquid crystal compound, a polymerizable liquid crystal composition including the same, and an optically anisotropic body.

BACKGROUND

A phase retarder is a type of optical element changing the polarization state of light passing through the same, and equally said a wave plate. When a light passes through an electromagnetic phase retarder, the polarization direction (direction of electric field vector) becomes a sum of two elements (an ordinary ray and an extraordinary ray) parallel or perpendicular to the optic axis, and changes after passing the phase retarder because the vector sum of two elements varies according to the birefringence and the thickness of the phase retarder. At this time, the plate that changes the polarization direction of light 90 degrees is called a quarter-wave plate ($\lambda/4$) and the plate that changes the polarization direction of light 180 degrees is called a half-wave plate ($\lambda/2$).

At this time, the phase difference value of the phase retarder depends of the wavelength, the wavelength dispersion of the phase difference value is classified into normal wavelength dispersion, flat wavelength dispersion, and reverse wavelength dispersion.

The phase retarder showing the reverse wavelength dispersion is most useful among them because it has specific phase differences ($\lambda/4$, $\lambda/2$, and so on) in wide wavelength band but the phase retarders formed from common resin films show normal wavelength dispersion in general.

In order to resolve such problem, many studies are being carried out. For example, Japanese Patent Publication Nos. 1998-068816, 1998-090521, 1999-052131, and 2000-002841 disclose laminate-type phase retarders formed by laminating a plurality of optically anisotropic layers. However, the laminate-type phase retarder having a lamination structure of a plurality of optically anisotropic layers has a disadvantage of low production yield and high production cost because the production process of the same needs a complicated process of not only arranging a plurality of films but also controlling the optical orientation of the films.

Meanwhile, a method of preparing a broadband $\lambda/4$ wave plate including only one phase retarder by inducing reverse dispersion through a film drawing has been already noticed. However, such wave plate is unsuitable for liquid crystal display devices requiring lamellation because the thickness of the plate is 100 μm or more.

And, Japanese Patent Publication No. 2002-267838 discloses a rod-type liquid crystal compound and a method of using a liquid crystal composition including a non-liquid crystal material that is oriented vertically to the major axis of said compound, for the purpose of preparing a thin layer broadband wave plate. However, in the case of the composition, there is a disadvantage that the reverse wavelength dispersion cannot be induced when the mixing ratio of the non-liquid crystal material is low and the liquid crystalline characteristics of the composition itself may be lost when the mixing ratio is high.

Therefore, the development of a thin broadband phase retarder which can exhibit stable reverse wavelength dispersion is required and particularly the study for the liquid crystal compound that makes it possible to prepare the phase retarder by a more simplified method is urgent.

SUMMARY OF THE INVENTION

It is an aspect of the present description to provide a polymerizable liquid crystal compound that makes it possible to exhibit stable reverse wavelength dispersion solely or by being mixed with other liquid crystal materials, and a polymerizable liquid crystal composition including the same.

It is another aspect of the present description to provide an optically anisotropic body that not only exhibits the reverse wavelength dispersion but also can be provided in the form of thin membrane or film.

According to one embodiment of the present description, a polymerizable liquid crystal compound including a radical derived from the first liquid crystal molecule including a mesogen group having a non-aromatic ring; a radical derived from the second liquid crystal molecule including a mesogen group that has a structure different from said mesogen group having a non-aromatic ring and includes a ring containing a double bond; and a linker represented by the following General Formula 1 that links the sp3-hybridized carbon in the non-aromatic ring of the radical derived from the first liquid crystal molecule and the sp2-hybridized carbon in the mesogen group of the radical derived from the second liquid crystal molecule, wherein at least one of the radicals derived from the first and the second liquid crystal molecules includes one or more polymerizable groups which are connected to the mesogen group directly or via spacer groups is provided:

[General Formula 1]

in General Formula 1, $M_1$ and $M_2$ are independently a single bond, —C≡C—, —C≡C—C≡C—, an arylene group, or a heteroarylene group; Q is —C≡C—, —$CR_4$=$CR_5$—, an arylene group, a heteroarylene group, or a divalent functional group that two or more of these groups are combined; one or more of $M_1$, $M_2$, and Q include —C≡C—, —C≡C—C≡C—, an arylene group, or a heteroarylene group; and $R_4$ and $R_5$ are independently H, F, Cl, CN, a $C_1$-$C_{10}$ alkyl group, or a $C_1$-$C_{10}$ acyl group; and p is an integer of 1 to 4, and each of 1 to 4 repeating units may be independently same to or different from each other.

According to another embodiment of the present description, a polymerizable liquid crystal composition including the polymerizable liquid crystal compound is provided. Such polymerizable liquid crystal composition may further include one or more additional liquid crystal compounds having a structure different from said polymerizable liquid crystal compound, and the additional liquid crystal compound may be a polymerizable or non-polymerizable liquid crystal compound.

According to still another embodiment of the present description, an optically anisotropic body including a cured material or a polymer obtained from the polymerizable liquid crystal composition, and an optical or electronic device including the same are provided.

Technical Effects

According to the present description, it is possible to provide the optically anisotropic body having thin thickness even showing stable reverse wavelength dispersion or plat wavelength dispersion by using the polymerizable liquid crystal compound. Particularly, such polymerizable liquid crystal compound exhibits excellent solubility and processability and can realize the reverse wavelength dispersion or the plat wavelength dispersion stably even when a photo-alignment layer is applied thereto. Therefore, the polymerizable liquid crystal compound makes it possible to easily provide the optically anisotropic body of a thin film type which realizes the reverse wavelength dispersion or the plat wavelength dispersion stably very effectively.

DETAILED DESCRIPTION OF THE EMBODIMENT

Figure 1:
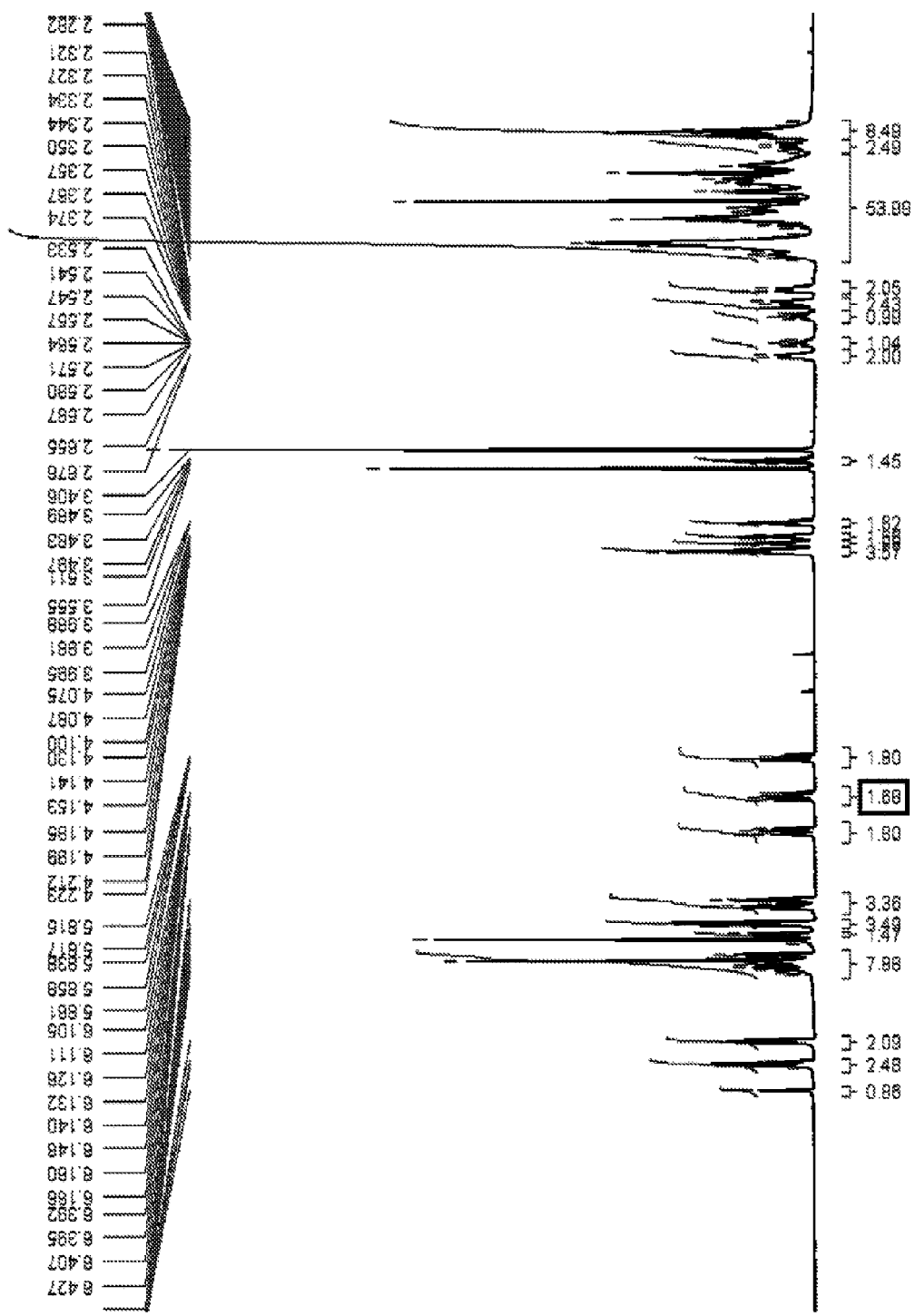
FIGS. 1 and 2 show NMR data of the polymerizable liquid crystal compounds prepared in Examples 1 and 2.

According to one embodiment of the present description, a polymerizable liquid crystal compound, including:

a radical derived from the first liquid crystal molecule including a mesogen group having a non-aromatic ring;

a radical derived from the second liquid crystal molecule including a mesogen group that has a structure different from said mesogen group having a non-aromatic ring and includes a ring containing a double bond; and a linker represented by the following General Formula 1 that links the sp3-hybridized carbon in the non-aromatic ring of the radical derived from the first liquid crystal molecule and the sp2-hybridized carbon in the mesogen group of the radical derived from the second liquid crystal molecule, wherein at least one of the radicals derived from the first and the second liquid crystal molecules includes one or more polymerizable groups which are connected to the mesogen group directly or via spacer groups is provided:

[General Formula 1]

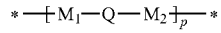

in General Formula 1, $M_1$ and $M_2$ are independently a single bond, —C≡C—, —C≡C—C≡C—, an arylene group, or a heteroarylene group; Q is —C≡C—, —$CR_4$=$CR_5$—, an arylene group, a heteroarylene group, or a divalent functional group that two or more of these groups are combined; one or more of $M_1$, $M_2$, and Q include —C≡C—, —C≡C—C≡C—, an arylene group, or a heteroarylene group; and $R_4$ and $R_5$ are independently H, F, Cl, CN, a $C_1$-$C_{10}$ alkyl group, or a $C_1$-$C_{10}$ acyl group; and p is an integer of 1 to 4, and each of 1 to 4 repeating units may be independently same to or different from each other.

In such polymerizable liquid crystal compound, the radicals derived from the first and the second liquid crystal molecules may be the radicals derived from the liquid crystal molecules satisfying the following Equations III and IV and exhibiting positive Δn(λ) value to the light of 450 nm to 650 nm wavelength respectively. Furthermore, the linker of General Formula 1 that links the radicals derived from the first and the second liquid crystal molecules may be the divalent radical derived from the compound satisfying the following Equations III and IV and exhibiting negative Δn(λ) value to the light of 450 nm to 650 nm wavelength:

$|\Delta n_{(\lambda 1)}|/|\Delta n_{(550nm)}| \geq 1.0$ (Equation III)

$|\Delta n_{(650 nm)}|/|n_{(\lambda 2)}| \leq 1.0$ (Equation IV)

in Equations III and IV, Δn(λ) means a birefringence at the wavelength λ in the liquid crystal phase, λ1 means the wavelength of 450 nm or more and less than 550 nm, and λ2 means the wavelength of 550 nm or more and less than 650 nm.

At this time, Equations III and IV mean that the absolute value of the birefringence at a certain wavelength λ decreases in general as the wavelength increases (namely, at long wavelength band), and it may mean that each of the radicals derived from the first and the second liquid crystal molecules and the linker of General Formula 1 is derived from the liquid crystal molecule (or compound) showing normal wavelength dispersity in general. For example, the radicals derived from the first and the second liquid crystal molecules and the linker may be the radical having the structure of the compound showing such normal wavelength dispersity from which hydrogen is eliminated.

In addition to such normal wavelength dispersity, the radicals derived from the first and the second liquid crystal molecules may be what are derived from the liquid crystal molecules exhibiting positive birefringence Δn(λ) value to the light of about 450 nm to 650 nm wavelength, and the linker may be what is derived from the compound exhibiting negative birefringence Δn(λ) value to the light of 450 nm to 650 nm wavelength. In addition, the radicals derived from the first and the second liquid crystal molecules may be what are derived from the liquid crystal molecules satisfying about $1.0 \leq |\Delta n_{(550nm)}|/|\Delta n_{(450nm)}| \leq$ about 1.05, and the linker may be what is derived from the compound satisfying about $1.1 \leq |\Delta n_{(550nm)}|/|\Delta n_{(450nm)}| \leq$ about 1.3 (or about 1.2).

In other words, the radicals derived from the first and the second liquid crystal molecules are derived from the liquid crystal molecules having positive birefringence at each wavelength band while exhibiting small wavelength dispersion characteristic that the difference between the absolute values of the birefringence classified by the wavelength band is not large, among normal wavelength dispersity, and thus it can be assumed that the radicals derived from the first and the second liquid crystal molecules themselves also satisfy such characteristic. Furthermore, the linker of General Formula 1 is derived from the compound having negative birefringence at each wavelength band while exhibiting large wavelength dispersion characteristic that the difference between the absolute values of the birefringence classified by the wavelength band is relatively remarkable, among normal wavelength dispersity, and thus it can be assumed that the linker also satisfies such characteristic.

Therefore, it is assumed that the polymerizable liquid crystal compound of one embodiment including the radicals derived from the first and the second liquid crystal molecules and the linker satisfying such characteristic together may show the specific wavelength dispersion characteristic and birefringence tendency on the whole because the wavelength dispersion characteristic and the birefringence tendency of each radical structure are reflected to the polymerizable liquid crystal compound. Namely, the wavelength dispersion characteristic and the birefringence tendency of said 2 kinds of radical structure are reflected to the liquid crystal compound of one embodiment, and thus the absolute value of the birefringence at short wavelength band can become smaller and oppositely the absolute value of the birefringence at long wavelength band can become larger.

Moreover, since the compound has the radicals derived from the first and the second liquid crystal molecules having small wavelength dispersion characteristic and the linker having large wavelength dispersion characteristic and showing negative birefringence together, the absolute value of the birefringence to the light of short wavelength can become smaller and oppositely the absolute value of the birefringence to the light of long wavelength band can become larger. For reference, the linker includes a functional group showing large absorption at near ultraviolet ray range such as an aromatic ring or an ethylenyl group (for example, ethylenyl group, an arylene group, a heteroarylene group, and the like), and such functional group may influence on the absorption characteristic at visible ray range. Therefore, the linker can exhibit a larger wavelength dispersion characteristic and can accentuate the tendency disclosed above.

Therefore, such polymerizable liquid crystal compound of one embodiment can show the tendency that the absolute value of the birefringence at the specific wavelength λ becomes larger in general as the wavelength increases (namely, at long wavelength band), and thus it can realize stable reverse wavelength dispersion or plat wavelength dispersion solely or by being mixed with other liquid crystal materials.

In the polymerizable liquid crystal compound of one embodiment, the radicals derived from the first and the second liquid crystal molecules may have mesogen groups of different structure. More specifically, the radical derived from the first liquid crystal molecule may include a mesogen group having a non-aromatic ring including at least one sp3-hybridized carbon therein such as an aliphatic ring, norbornene ring, camphor ring, adamantine ring, and the like. On the contrary, the radical derived from the second liquid crystal molecule may include a mesogen group having an unsaturated aliphatic ring including at least one sp2-hybridized carbon therein, an unsaturated aliphatic ring including a heteroelement, an arylene ring, a heteroarylene ring, and the like.

In addition, the linker of General Formula 1 links the sp3-hybridized carbon included in the mesogen group of the radical derived from the first liquid crystal molecule and the sp2-hybridized carbon included in the mesogen group of the radical derived from the second liquid crystal molecule, and can make the polymerizable liquid crystal compound of one embodiment to have an asymmetric structure on the whole.

Most of known liquid crystal compounds have vertically or horizontally symmetric structure and for example the liquid crystal compound of horizontally symmetric structure in which the linker corresponding to General Formula 1 links sp3-hybridized carbons of identical mesogen groups has been known. However, it is recognized that such known liquid crystal compound of symmetric structure has poor solubility to solvent. On the contrary, it is recognized that the polymerizable liquid crystal compound of one embodiment shows more improved solubility to various solvents even maintaining its excellent optical characteristics because it has asymmetric structure as disclosed above. Therefore, the solution including such liquid crystal compound can exhibit more improved processability in coating process and the like.

Moreover, prior liquid crystal compounds of horizontal symmetry type disclosed above may not realize the birefringence and the wavelength dispersion characteristic sufficiently when the anchoring energy of the alignment layer formed at the underpart for aligning the compound is low. Accordingly, it may be impossible to realize the reverse wavelength dispersion or the plat wavelength dispersion properly by using the liquid crystal compound. In general, a photo-alignment layer is being used for the liquid crystal alignment instead of prior rubbing alignment layer recently but it is known that the anchoring energy of such photo-alignment layer is low. Therefore, if the photo-alignment layer is applied to the liquid crystal compound of horizontal symmetry type disclosed above for aligning the liquid crystal, it becomes difficult to provide an optically anisotropic body that realizes the reverse wavelength dispersion or the plat wavelength dispersion effectively.

In contrast, since the polymerizable liquid crystal compound of one embodiment having said asymmetric structure (namely, asymmetric structure that the radicals derived from the first and the second liquid crystal molecules have the mesogen groups of different structure and the linker links the sp3-hybridized carbon and the sp2-hybridized carbon included in each mesogen group) exhibits the birefringence and the wavelength dispersion characteristic of each radical structure disclosed above better, it makes it possible to realize the reverse wavelength dispersion or the plat wavelength dispersion more effectively even though the photo-alignment layer having relatively low anchoring energy is applied thereto.

Like this, the polymerizable liquid crystal compound makes it possible to exhibit stable reverse wavelength dispersion or plat wavelength dispersion solely or in the state of being mixed with other liquid crystal materials and can satisfy the following Equations I and II:

$$|\Delta n_{(\lambda 1)}|/|\Delta n_{(550nm)}| \leq 1.0 \quad \text{(Equation I)}$$

$$|\Delta n_{(650nm)}|/|n_{(\lambda 2)}| \geq 1.0 \quad \text{(Equation II)}$$

in Equations I and II, Δn(λ) means a birefringence at the wavelength λ in the liquid crystal phase, λ1 means the wavelength of 450 nm or more and less than 550 nm, and λ2 means the wavelength of 550 nm or more and less than 650 nm.

Equations I and II mean that the absolute value of the birefringence at a certain wavelength λ is maintained or increases in general as the wavelength increases (namely, at long wavelength band), and it may mean that the polymerizable liquid crystal compound of one embodiment exhibits the reverse wavelength dispersion or the plat wavelength dispersion.

Meanwhile, in the polymerizable liquid crystal compound of one embodiment, at least one of the radicals derived from the first and the second liquid crystal molecules may have one or more polymerizable groups which are connected to the mesogen group directly or via spacer groups, and preferably both of the radicals derived from the first and the second liquid crystal molecules may have one or more of polymerizable groups disclosed above.

At this time, said 'polymerizable group' can be defined as an arbitrary crosslinkable or polymerizable functional group such as an unsaturated bond, a (meth)acrylate group, and the like and for example it may mean an acrylate group, a methacrylate group, an epoxy group, and the like.

Because of such polymerizable group, the liquid crystal alignment can be stabilized through the crosslinking or polymerization between said polymerizable groups or with other binders after LC (liquid crystal)-aligning the mesogen group of the polymerizable liquid crystal compound, and it is possible to form a optically anisotropic body of membrane or film type containing the liquid crystal.

Meanwhile, in said polymerizable liquid crystal compound, for example, the radical derived from the first liquid crystal molecule may be the radical represented by the following General Formula 2:

[General Formula 2]

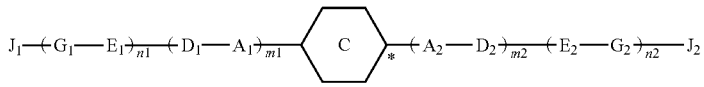

in General Formula 2, ring C is a non-aromatic ring of an aliphatic 6 member ring including or not including one or more oxygen or silicon, norbornene ring, camphor ring, or adamantine ring;

$A_1$, $A_2$, $E_1$, and $E_2$ are independently a single bond or a divalent connecting group;

$D_1$ and $D_2$ are independently a divalent functional group including one or more rings selected from the group consisting of a substituted or non-substituted aromatic ring, a substituted or non-substituted aliphatic ring, a substituted or non-substituted heteroaliphatic ring, and a substituted or non-substituted heteroaromatic ring;

$G_1$ and $G_2$ are independently a single bond or an alkylene group;

$J_1$ and $J_2$ are independently hydrogen or a polymerizable group and at least one of $J_1$ and $J_2$ is a polymerizable functional group; and m1, m2, n1, and n2 are independently an integer of 1 to 5.

Furthermore, the radical derived from the second liquid crystal molecule may be the radical represented by the following General Formula 3, 4, 5, or 6:

in General Formulae 3 to 6, $A_3$, $A_4$, $E_3$, and $E_4$ are independently a single bond or a divalent connecting group;

$D_3$ and $D_4$ are independently a divalent functional group including one or more rings selected from the group consisting of a substituted or non-substituted aromatic ring, a substituted or non-substituted aliphatic ring, a substituted or non-substituted heteroaliphatic ring, and a substituted or non-substituted heteroaromatic ring;

$G_3$ and $G_4$ are independently a single bond or an alkylene group;

$J_3$ and $J_4$ are independently hydrogen or a polymerizable group and at least one of $J_3$ and $J_4$ is a polymerizable functional group;

$R_1$ to $R_5$ are independently hydrogen, a halogen, —CN, an alkyl group, or an acyl group;

$B_1$ is N or P, and $B_2$ is O or S; and m3, m4, n3, and n4 are independently an integer of 1 to 5.

More specifically, for example, the polymerizable liquid crystal compound of one embodiment including the radicals derived from the first and the second liquid crystal molecules

[General Formula 3]

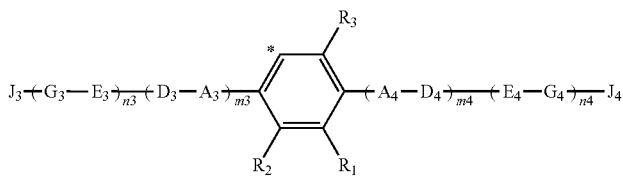

[General Formula 4]

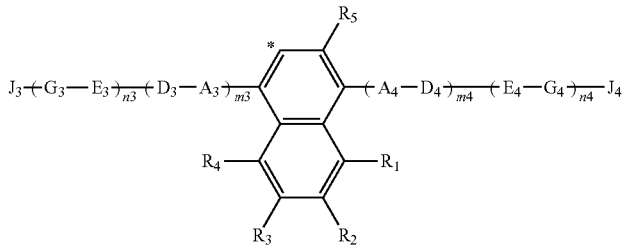

[General Formula 5]

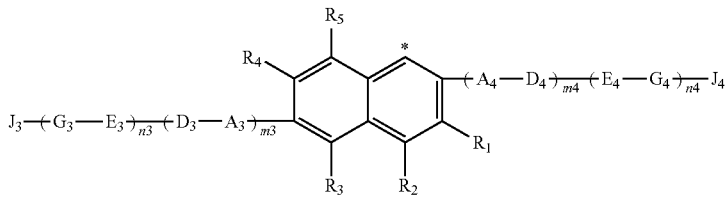

[General Formula 6]

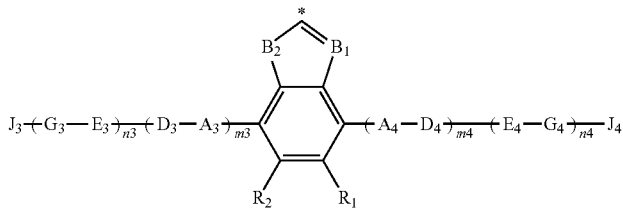

and the linker liking them may be the compounds represented by the following Chemical Formula 1, 2, 3, or 4:
[Chemical Formula 1]
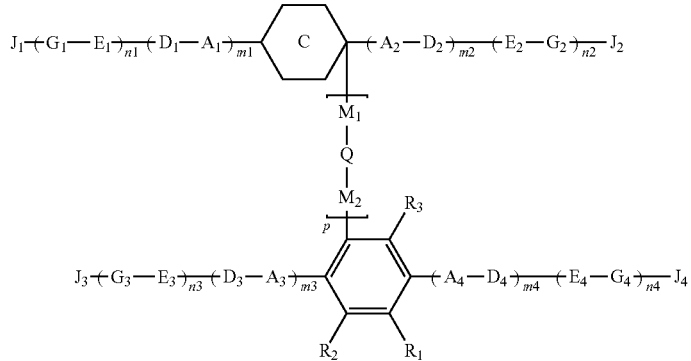
[Chemical Formula 2]
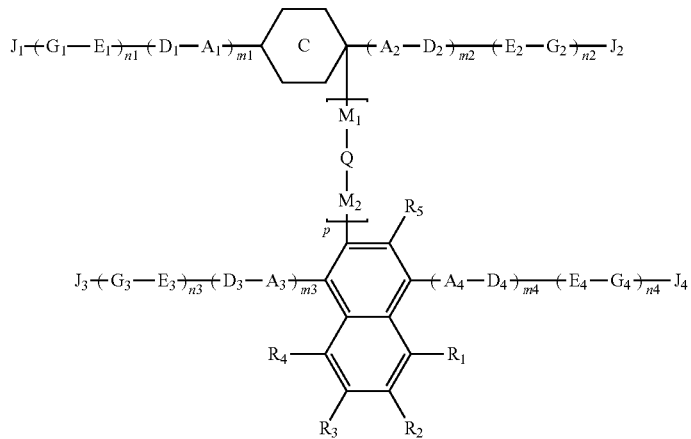
[Chemical Formula 3]
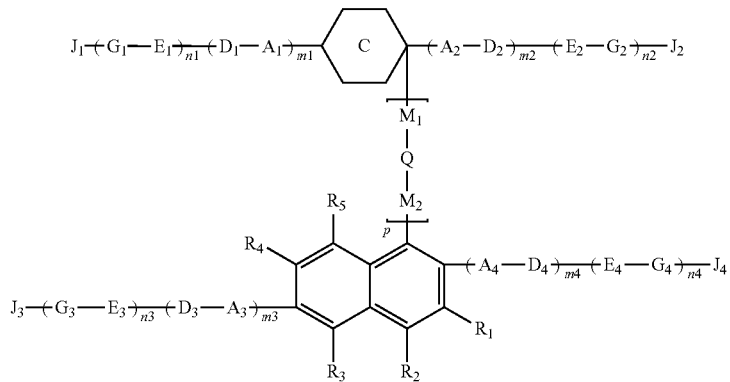

[Chemical Formula 4]

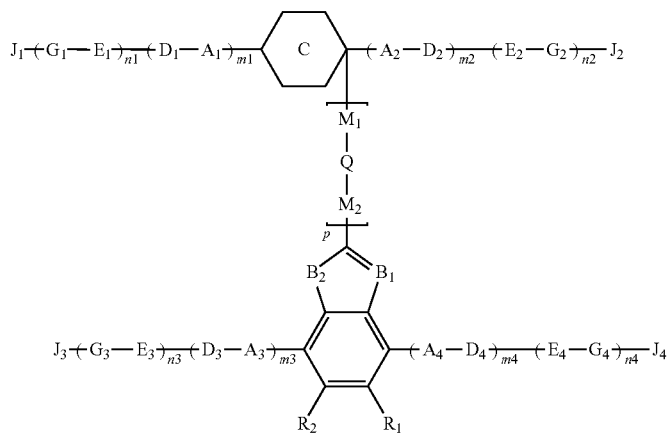

in Chemical Formulae 1 to 4, ring C, $A_1$ to $A_4$, $E_1$ to $E_4$, $D_1$ to $D_4$, $G_1$ to $G_4$, $J_1$ to $J_4$, $M_1$, $M_2$, Q, $R_1$ to $R_5$, $B_1$, $B_2$, m1 to m4, and n1 to n4 are the same as above disclosure defined about General Formulae 1 to 4.

In the radicals of General Formulae 1 to 6 and the compounds of Chemical Formulae 1 to 4, each functional group may be defined as follows.

At first, the 'divalent connecting group' in $A_1$ to $A_4$ and $E_1$ to $E_4$ may be —O—, —S—, —CO—, —COO—, —OCO—, —O—COO—, —CO—NR—, —NR—CO—, —NR—CO—NR—, —OCH$_2$—, —CH$_2$O—, —SCH—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —C=C—, or —C≡C—, and said R may be independently hydrogen or a $C_1$-$C_{10}$ alkyl group.

And, said $D_1$ to $D_4$ may be independently a divalent functional group including one or more rings selected from the group consisting of a substituted or non-substituted aromatic ring, a substituted or non-substituted aliphatic ring, a substituted or non-substituted heteroaliphatic ring, and a substituted or non-substituted heteroaromatic ring, and such divalent functional group may include not only the group consisting of the ring itself but also the divalent functional group that the rings are connected via other functional group such as a $C_1$-$C_{10}$ alkylene, —COO—, —OCO—, —O—, —S—, —O—($C_1$-$C_{10}$ alkylene)-, and the like. More specific example of the divalent functional group may be -Ph-, -Ph(OCH$_3$)—, —CH$_2$Ph-, -PhCH$_2$—, —CH$_2$CH$_2$-Ph-, -PhCH$_2$CH$_2$—, cyclohexylene, -cyclohexylene-(OCH$_3$)—, —CH$_2$-cyclohexylene-, -cyclohexylene-CH$_2$—, —CH$_2$CH$_2$-cyclohexylene-, -cyclohexylene-CH$_2$CH$_2$—, and the like.

Furthermore, said $G_1$ to $G_4$ may be independently a single bond or a $C_1$-$C_{10}$ alkylene group.

And, said $J_1$ to $J_4$ may be independently hydrogen or a polymerizable group, and here said 'polymerizable group' can be defined as an arbitrary crosslinkable or polymerizable functional group such as an unsaturated bond, a (meth)acrylate group, and the like. For example, the functional group may be an acrylate group, a methacrylate group, an epoxy group, and the like.

Furthermore, in $M_1$, $M_2$, and Q, the arylene group and the heteroarylene group may be a $C_6$-$C_{40}$ arylene group and a $C_5$-$C_{40}$ heteroarylene group. And, said Q may be not only each of —C≡C—, —CR$_4$=CR$_5$—, an arylene group, and a heteroarylene group but also a divalent functional group that two or more of them are combined, for example, a functional group that arylene groups such as phenylene group and the like are combined with both sides of —C≡C—, or two —C≡C— are combined with both sides of the arylene group in reverse. For example, the linker of General Formula 1 in which $M_1$, $M_2$, and Q are combined may be -Ph-C≡C-Ph-, -Ph-C≡C-Ph-C≡C-Ph-, -Ph-C≡C-Ph-Ph-C≡C-Ph-, —C≡C-Ph-Ph-C≡C—, —C≡C-Ph-C≡C-Ph-C≡C—, and so on.

And, said p, m1, m2, m3, m4, n1, n2, n3, and n4 may be 1 or an integer of 2 or more. When they are defined as an integer of 2 or more, 2 or more repeating units included according to the definition may be identical or different from each other. For example, when m4 is defined as 2 in the repeating unit structure of

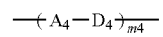

included in General Formula 3, two repeating units of

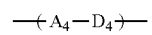

can be included and at this time two identical repeating units can be repeated or two different repeating units can be repeated according to the definition of $A_4$ and $D_4$ disclosed above. This point can be applied to the repeating unit structures included in General Formulae 1 to 6 and Chemical Formulae 1 to 4.

Since the polymerizable liquid crystal compound (more specifically, the compound selected from Chemical Formulae 1 to 4) that includes the radical derived from the first liquid crystal molecule of General Formula 2 and the radical derived from the second liquid crystal molecule selected from General Formulae 3 to 6 in company with the linker of General Formula 1 is used, it becomes possible to exhibit the wavelength dispersion characteristic of each radical structure more effectively on the principle disclosed above and to realize stable reverse wavelength dispersion or plat wavelength dispersion solely or by being mixed with other liquid crystal materials.

Meanwhile, the compounds of Chemical Formulae 5 to 9 may be some examples of the polymerizable liquid crystal compound of Chemical Formulae 1 to 4:

[Chemical Formula 5]
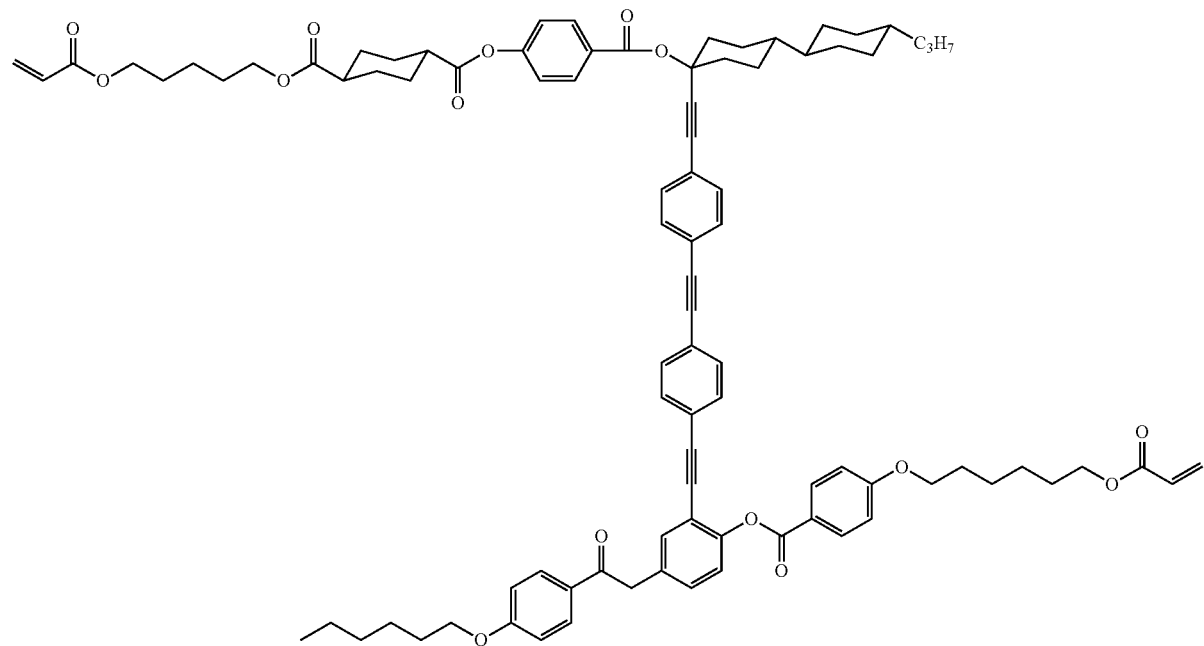
[Chemical Formula 6]
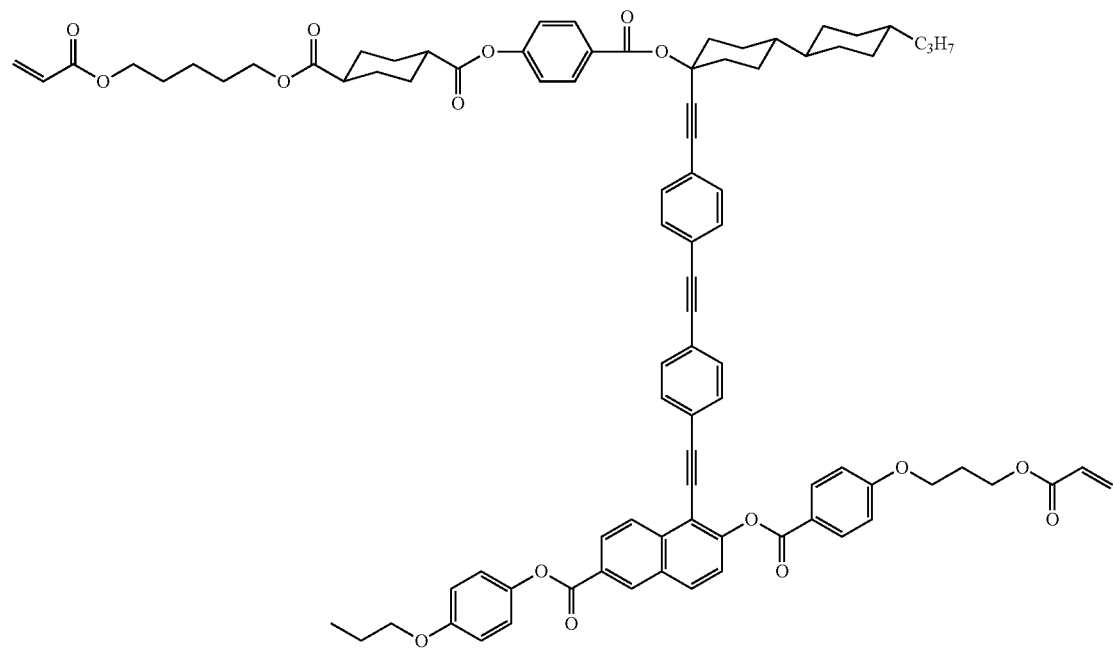

[Chemical Formula 7]
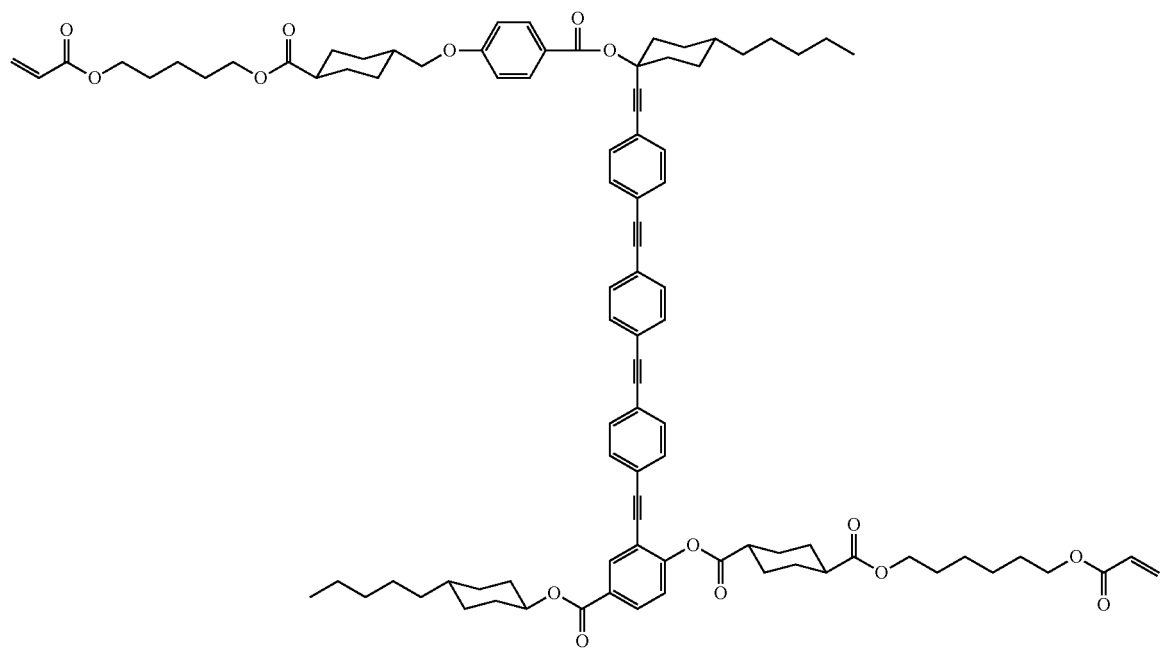
[Chemical Formula 8]
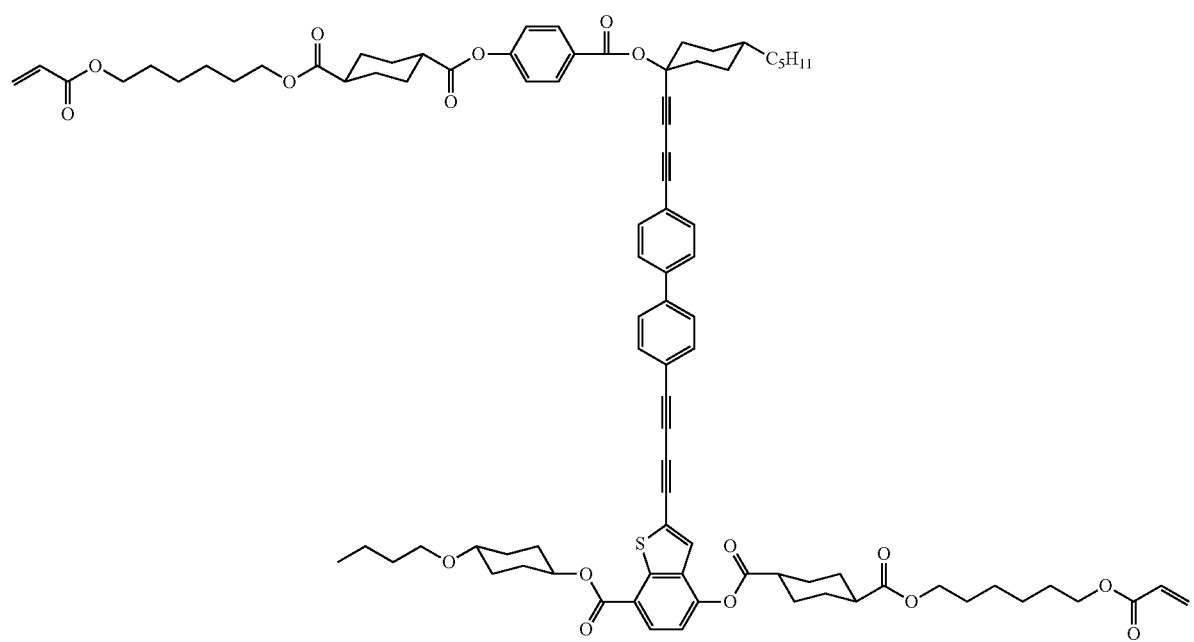

[Chemical Formula 9]

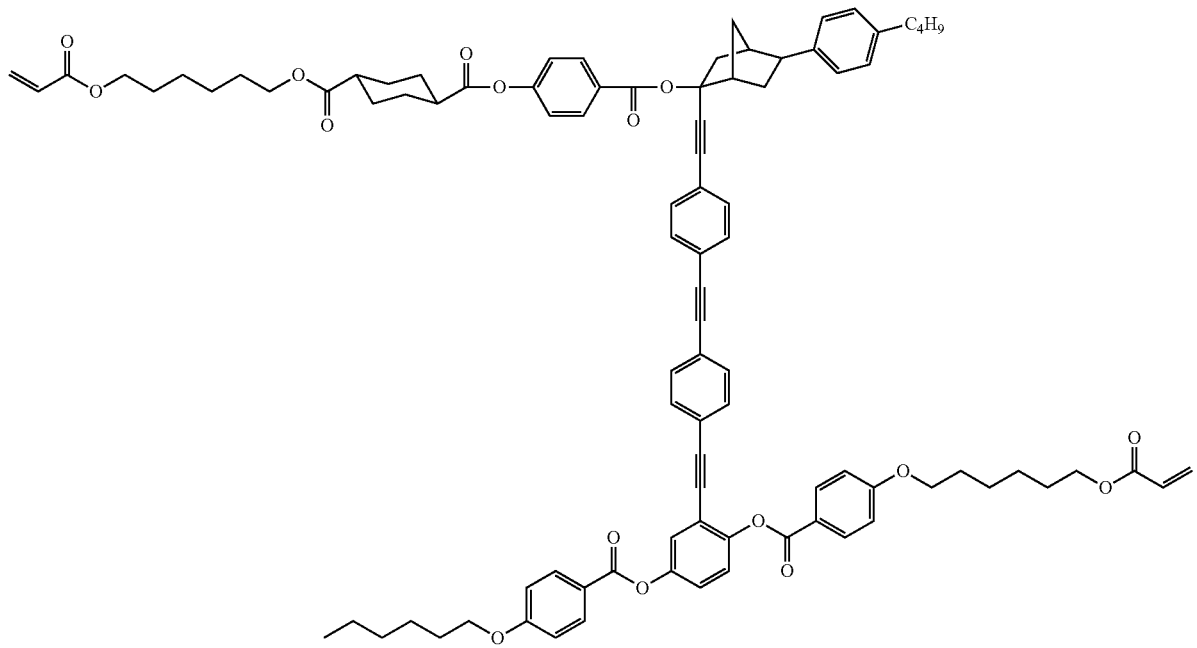

The polymerizable liquid crystal compound of one embodiment disclosed above can be prepared by introducing the functional group and the linker according to reaction conditions and method usual for a person skilled in the related art, depending on the kinds of the functional group to be introduced. More specific reaction conditions and methods of the same are disclosed in detail in below Examples.

Meanwhile, according to another embodiment of the present description, a polymerizable liquid crystal composition including the polymerizable liquid crystal compound of one embodiment disclosed above is provided.

Such polymerizable liquid crystal composition may further include one or more additional liquid crystal compounds having a structure different from said polymerizable liquid crystal compound, and such additional liquid crystal compound may be a polymerizable liquid crystal compound having mesogen group and two terminal polymerizable groups connected to the mesogen group directly or via spacer groups or a non-polymerizable liquid crystal compound having no polymerizable group.

Furthermore, the additional liquid crystal compound may be the compound exhibiting negative $\Delta n(\lambda)$ value to the light of 450 nm to 650 nm wavelength and satisfying the following Equations III and IV (namely, the compound showing normal wavelength dispersion in general):

$$|\Delta n_{(\lambda 1)}|/|\Delta n_{(550nm)}| \geq 1.0 \quad \text{(Equation III)}$$

$$|\Delta n_{(650nm)}|/|\Delta n_{(\lambda 2)}| \leq 1.0 \quad \text{(Equation IV)}$$

in Equations III and IV, $\Delta n(\lambda)$ means a birefringence at the wavelength $\lambda$ in the liquid crystal phase, $\lambda 1$ means the wavelength of 450 nm or more and less than 550 nm, and $\lambda 2$ means the wavelength of 550 nm or more and less than 650 nm.

Like this, since the additional liquid crystal compound having negative birefringence to the light of a specific wavelength and showing normal wavelength dispersion is used together, the absolute value of the birefringence to the light of short wavelength can be largely decreased and the absolute value of the birefringence to the light of long wavelength can be relatively less decreased in reverse. Therefore, the reverse wavelength dispersion or the plat wavelength dispersion can be realized more effectively by using the additional liquid crystal compound together.

The compounds of Chemical Formulae 10 to 13 are examples of the additional liquid crystal compound:

[Chemical Formula 10]

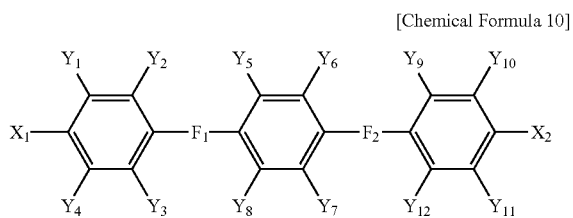

[Chemical Formula 11]

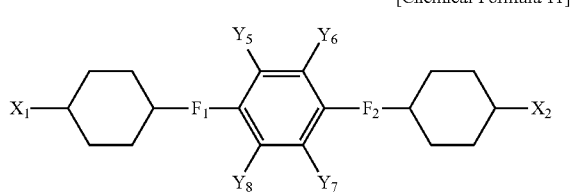

[Chemical Formula 12]

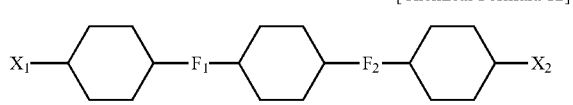

[Chemical Formula 13]

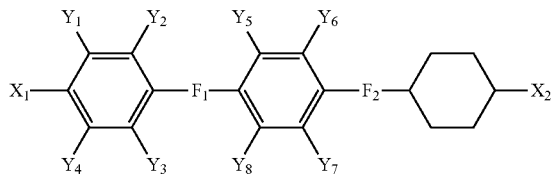

in Chemical Formulae 10 to 13, $F_1$ and $F_2$ are independently a single bond, —C(=O)—, —OC(=O)—, —C(=O)O—, or a $C_1$-$C_{10}$ alkylene group;

$Y_1$ to $Y_{12}$ are independently H, a halogen such as F, Cl, and so on, —CN, a $C_1$-$C_{10}$ alkyl substituted or not substituted with a halogen and so on, a $C_1$-$C_{10}$ alkoxy substituted or not substituted with a halogen and so on, a $C_1$-$C_{10}$ alkyl carbonyl substituted or not substituted with a halogen and so on, a $C_1$-$C_{10}$ alkoxy carbonyl substituted or not substituted with a halogen and so on, or a $C_1$-$C_{10}$ alkyl ester substituted or not substituted with a halogen and so on; and $X_1$ and $X_2$ are independently hydrogen or a functional group of the following Chemical Formula 10a;

Gm-Jm-Lm-k-Nm-Qm　　　　[Chemical Formula 10a]

Gm, Lm, and Nm are independently a single bond, —O—, —S—, —C(=O)—, —C(=O)O—, —OC(=O)—, —OC(=O)O—, —C(=O)NR—, —NRC(=O)—, —NRC(=O)NR—, —OCH$_2$—, —CH$_2$O—, —SCH$_2$—, —CH$_2$S—, —CF$_2$O—, —OCF$_2$—, —CF$_2$S—, —SCF$_2$—, or a $C_1$-$C_{10}$ alkylene group substituted or not substituted with fluorine such as —CH$_2$—(CH$_2$)$_2$—, —(CH$_2$)$_3$—, —(CH$_2$)$_4$—, —CF$_2$CH$_2$—, —CH$_2$CF$_2$—, —CF$_2$CF$_2$—, and the like, here R is hydrogen or a $C_1$-$C_{10}$ alkyl group;

Jm and Mm are independently a single bond, a $C_1$-$C_{10}$ alkylene group, or a $C_3$-$C_{10}$ cycloalkylene group; and Qm is hydrogen, a $C_1$-$C_{10}$ alkyl group, or a polymerizable group such as an acrylate, a methacrylate, an epoxy, and the like.

In such additional liquid crystal compound, at least one of $X_1$ and $X_2$ may be the functional group of Chemical Formula 10a in which Qm is a polymerizable group, and at this time the additional liquid crystal compound may be a polymerizable liquid crystal compound. In this case, said polymerizable group can be crosslinked or polymerized with the polymerizable groups included in the polymerizable liquid crystal compound of one embodiment, and the liquid crystal alignment can be more stable. And, the surface hardness of the optically anisotropic body of membrane or film type can be more improved.

Meanwhile, for example, said polymerizable liquid crystal composition may further include a polymerizable binder such as an acrylate binder and the like, and may further include a polymerization initiator and a solvent in addition to this. At this time, any known binders, initiators, and solvent can be used without limitation if they can be used with common polymerizable liquid crystal compounds, and additional explanation about them is omitted here.

In addition, according to one example of the present description, said liquid crystal composition may further include one or more mono-acrylate compounds selected from the group consisting of the compounds of Chemical Formulae 14 to 19:

[Chemical Formula 14]

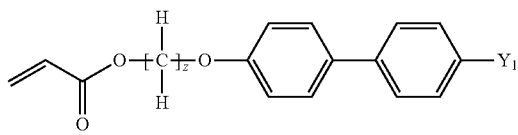

[Chemical Formula 15]

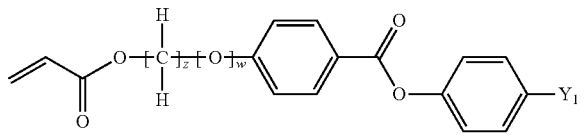

[Chemical Formula 16]

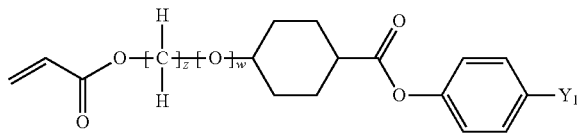

[Chemical Formula 17]

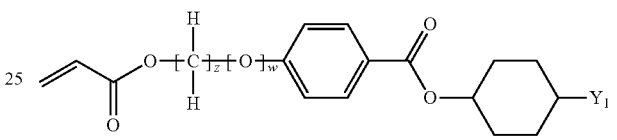

[Chemical Formula 18]

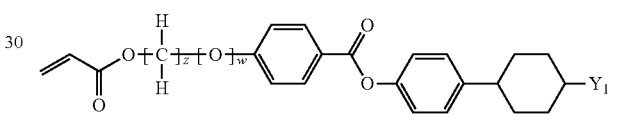

[Chemical Formula 19]

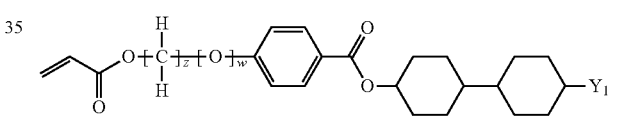

in Chemical Formulae 14 to 19, Z is independently an integer of 0 to 12; W is 0 or 1; $Y_1$ is independently H, a halogen such as F, Cl, and so on, —CN, a $C_1$-$C_{10}$ alkyl substituted or not substituted with a halogen and so on, a $C_1$-$C_{10}$ alkoxy substituted or not substituted with a halogen and so on, a $C_1$-$C_{10}$ alkyl carbonyl substituted or not substituted with a halogen and so on, a $C_1$-$C_{10}$ alkoxy carbonyl substituted or not substituted with a halogen and so on, or a $C_1$-$C_{10}$ alkyl ester substituted or not substituted with a halogen and so on.

More specific examples of such mono-acrylate compounds may be the compounds of Chemical Formulae 20 to 29:

[Chemical Formula 20]

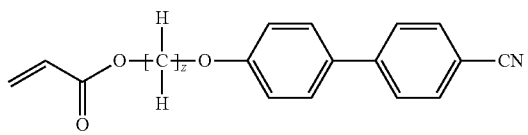

[Chemical Formula 21]

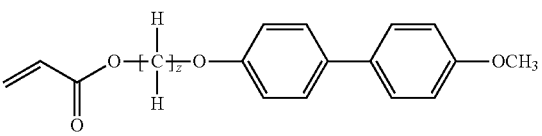

-continued

[Chemical Formula 22]

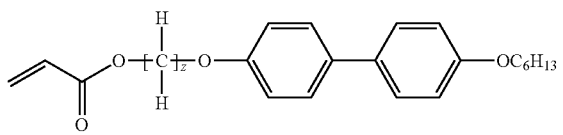

[Chemical Formula 23]

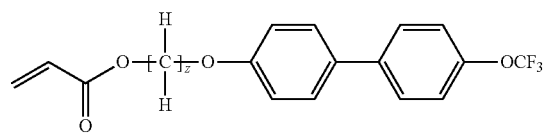

[Chemical Formula 24]

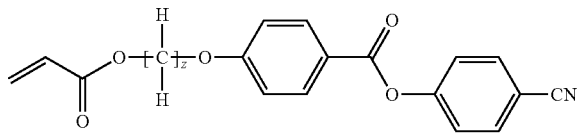

[Chemical Formula 25]

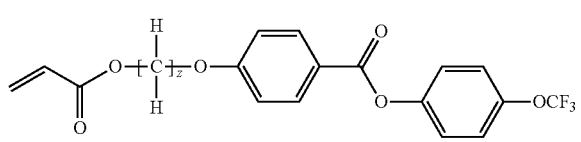

[Chemical Formula 26]

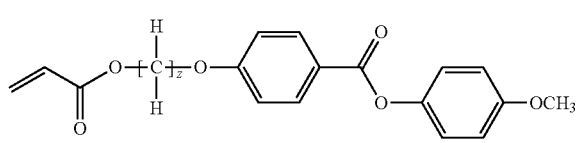

[Chemical Formula 27]

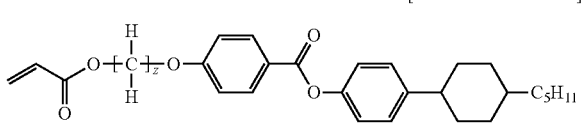

[Chemical Formula 28]

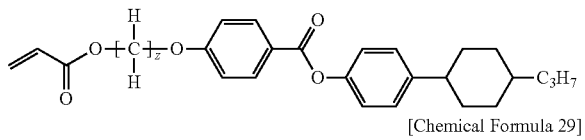

[Chemical Formula 29]

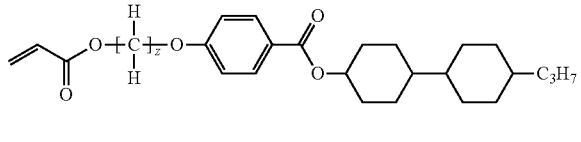

in Chemical Formulae 20 to 29, Z is independently an integer of 0 to 12.

Meanwhile, the polymerizable liquid crystal composition is coated on an alignment layer such as photo-alignment layer or a rubbing alignment layer and the liquid crystal compound included in the composition can be LC (liquid crystal)-aligned by such alignment layer. Subsequently, the optically anisotropic body of membrane or film type can be obtained by crosslinking or polymerizing the polymerizable liquid crystal compound and optionally with the polymerizable binder or the mono-acrylate compound by the medium of the polymerization initiator while drying and eliminating the solvent. According to such crosslinking, polymerization, or curing, the polymerizable liquid crystal compound forms a crosslinked or polymerized structure by themselves or together with the binder or the mono-acrylate compound and can make the liquid crystal alignment stable, and the shape of membrane or film can be formed.

Therefore, according to still another embodiment of the present description, an optically anisotropic body including a cured material or a polymer obtained from said polymerizable liquid crystal composition is provided. In such optically anisotropic body, at least part of the polymerizable groups of the polymerizable liquid crystal compound may be crosslinked or addition-polymerized. And, the optically anisotropic body may be in the form of membrane or film, and may realize stable reverse wavelength dispersion or plat wavelength dispersion and satisfy the following Equations V and VI:

$$R_{(\lambda 1)}/R_{(550nm)} \leq 1.0 \quad \text{(Equation V)}$$

$$R_{(650nm)}/R_{(\lambda 2)} \geq 1.0 \quad \text{(Equation VI)}$$

in Equations V and VI, $R(\lambda)$ is the phase difference on optical axis at the wavelength $\lambda$ that is defined as $|\Delta n(\lambda)| \cdot d$, $\Delta n(\lambda)$ means a birefringence at the wavelength $\lambda$ in the liquid crystal phase, d means the thickness (nm) of the membrane or film, $\lambda 1$ means the wavelength of 450 nm or more and less than 550 nm, and $\lambda 2$ means the wavelength of 550 nm or more and less than 650 nm.

And, said optically anisotropic body of membrane or film type includes the cured material or the polymer obtained from said polymerizable liquid crystal composition and may further include an alignment layer below the cured material or the polymer. Such alignment layer may include an alignment polymer for aligning the liquid crystal compound included in the polymerizable liquid crystal composition, and it may be an alignment layer formed in a prior known alignment way such as the rubbing alignment or the photo-alignment. The kinds of the alignment polymer which can be included in the alignment layer according to each alignment way are well known to a person skilled in the related art.

Since said optically anisotropic body can realize the reverse wavelength dispersion or the plat wavelength dispersion effectively and can be formed into a thinner membrane or film form easily, it can be applied to various optical or electronic devices.

For example, the optically anisotropic body may be applied to very various optical or electronic devices such as electrooptical displays, LCDs, OLED, hologram devices, 3D display devices, optical information storage devices, electronic devices, organic semiconductors, organic field effect transistors (OFET), integrated circuits (IC), thin film transistors (TFT), radio frequency identification (RFID) tags, organic light emitting diodes (OLED), organic light emitting transistors (OLET), electroluminescent displays, organic photovoltaic (OPVO) devices, organic solar cells (O-SC), organic laser diodes (O-laser), organic integrated circuit (O-IC), lighting devices, sensor devices, electrode materials, photoconductors, Schottky diodes, non-linear optic (NLO) devices, photodetectors, electrophotographic recording devices, capacitors, photoconductors, electronic photograph goods, electronic photograph documentaries, organic memory devices, biosensors, biochips, and so on.

Furthermore, the optically anisotropic body may be applied to very various devices, parts, or uses of optical films such as anti-reflection films or anti-glare films, polarizers, compensators, beam splitters, reflection films, alignment layers, color filters, decoration or security markings, LC pigments, adhesives, electron injection layers, planarization layers, antistatic films, conductive substrates, conductive patterns, and the like of said optical or electronic devices.

Hereinafter, the functions and effects of the polymerizable liquid crystal compound, the polymerizable liquid crystal composition, and the optically anisotropic body according to the present description are revealed in more detail through some Examples. However, the following Examples are only provided for exemplifying the description, and the scope of the present description is not limited to or by them.

Preparation Example 1

Synthesis of Intermediate 1

The following Intermediate 1 was synthesized according to the reaction conditions and methods shown in the following Reaction Formula 1:

[Intermediate 1]

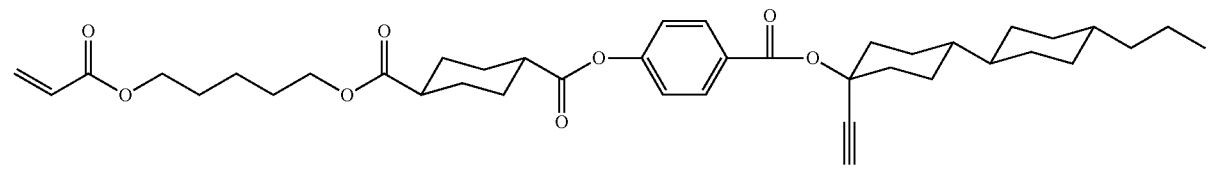

[Reaction Formula 1]

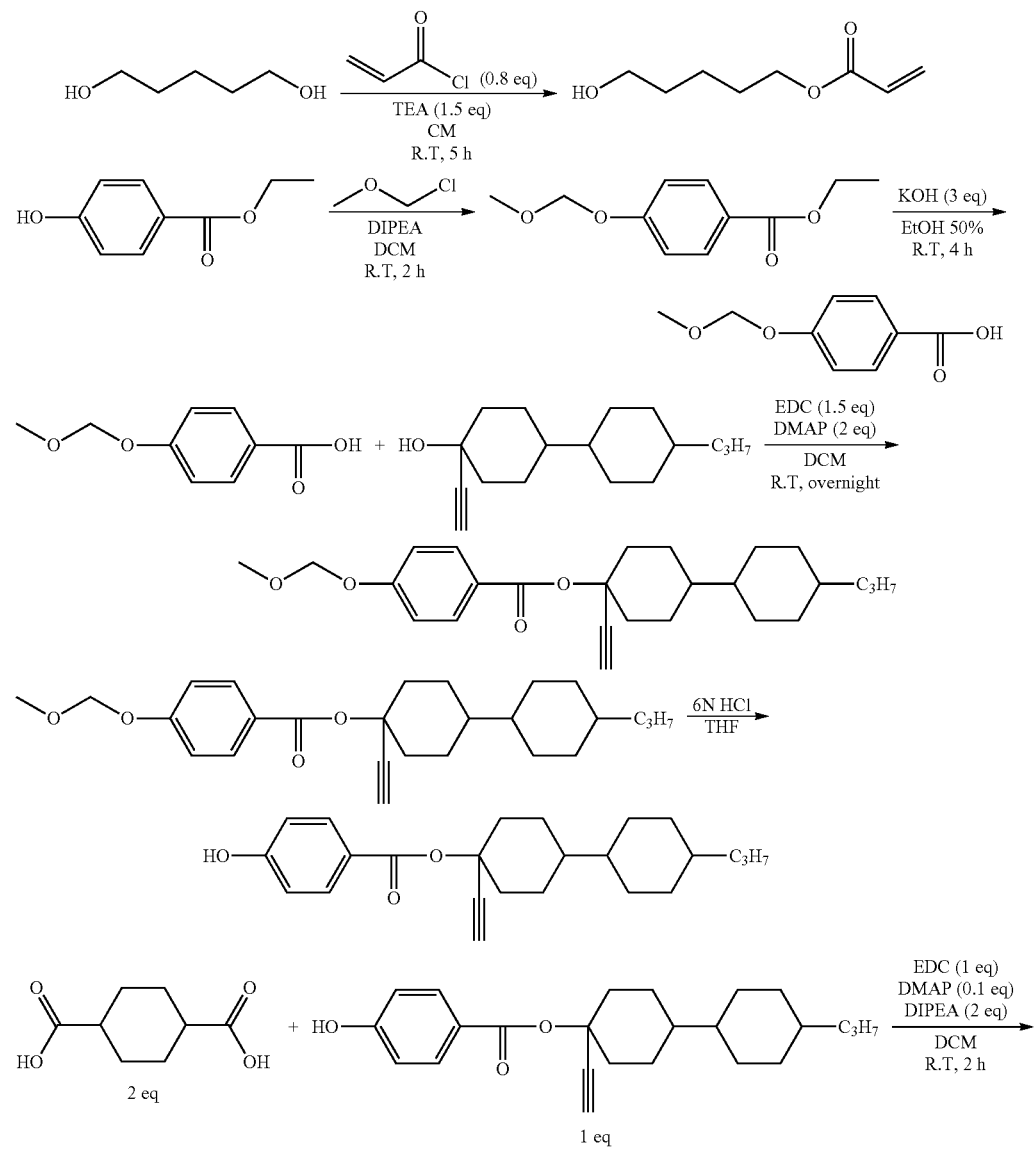

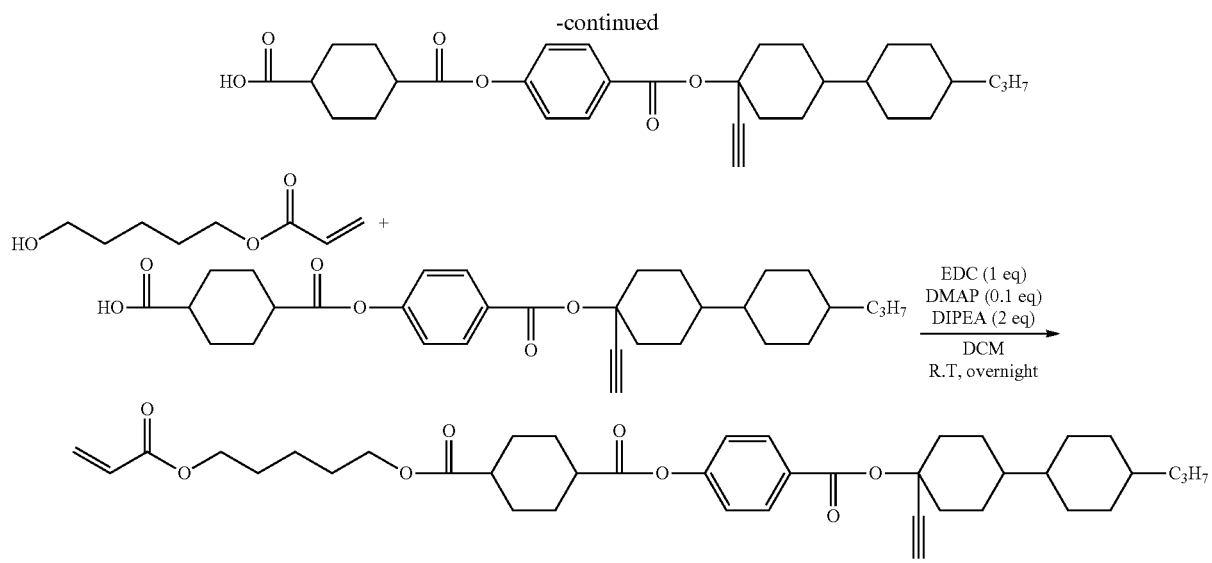

in Reaction Formula 1, each abbreviation can be defined as follows:

TEA: triethylamine; DCM: dichloromethane; R.T.: room temperature; DIPEA: N,N'-diisopropylethylamine; EDC: 1-ethyl-3-[3-dimethylaminopropyl]carboimide hydrochloride; DMAP: 4-dimethylaminopyridine.

Preparation Example 2

Synthesis of Intermediate 2

The following Intermediate 2 was synthesized substantially according to the same methods and conditions as in Preparation Example 1, except that

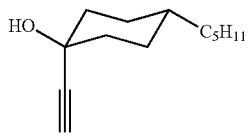

was used instead of

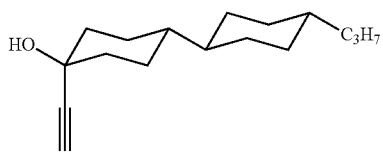

in Reaction Formula 1 of Preparation Example 1:

[Intermediate 2]

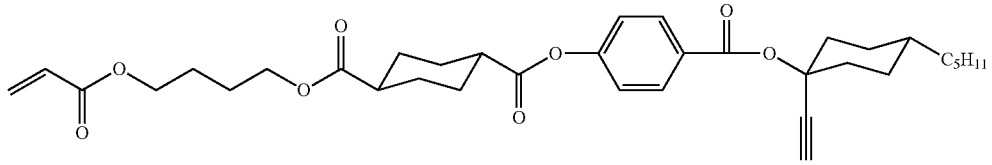

Preparation Example 3
Synthesis of Intermediate 3
The following Intermediate 3 was synthesized according to the reaction conditions and methods shown in the following Reaction Formula 2:
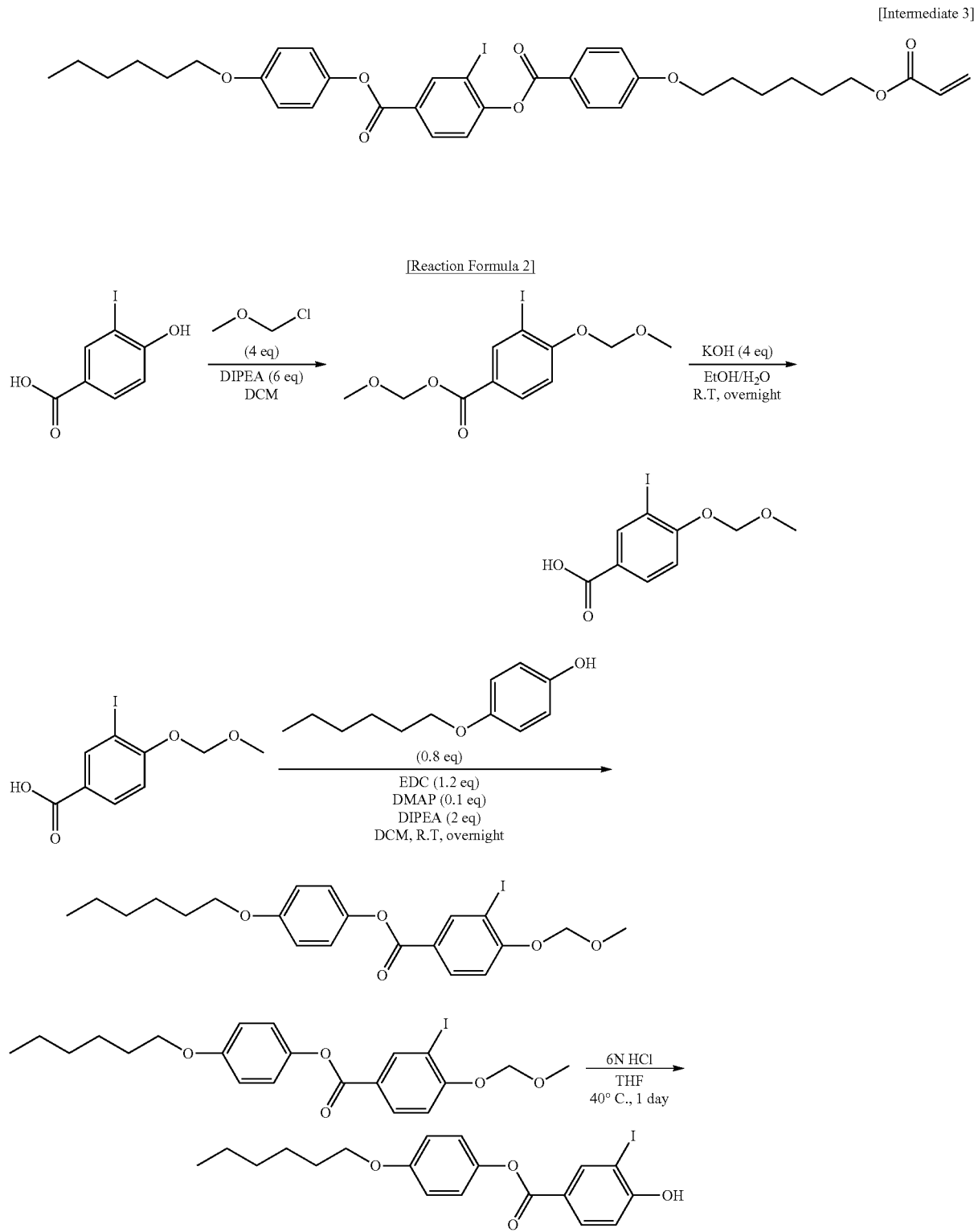

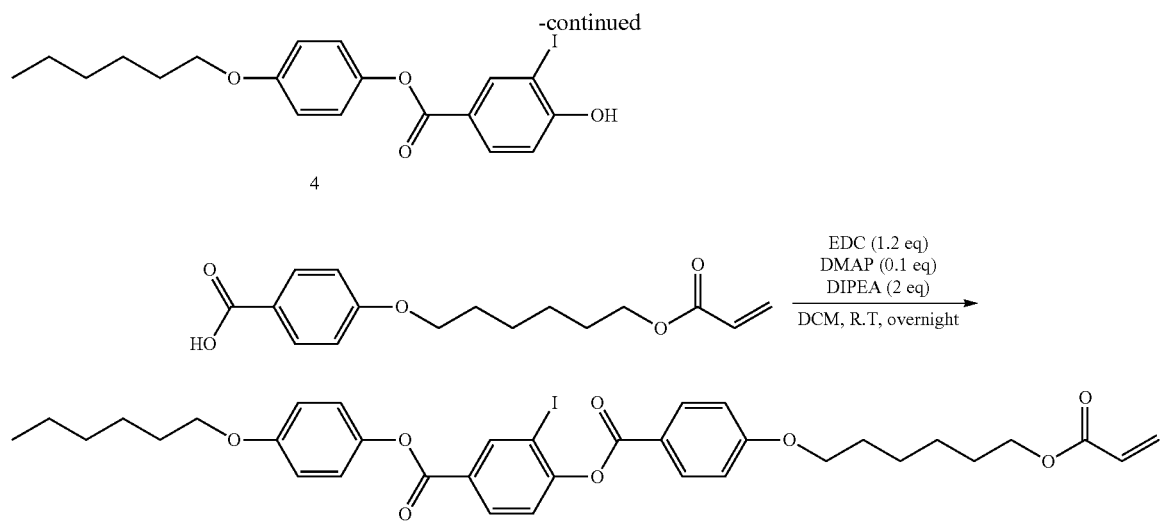

in Reaction Formula 2, each abbreviation can be defined as follows:

DCM: dichloromethane; DIPEA: N,N'-diisopropylethylamine; R.T.: room temperature; EDC: 1-ethyl-3-[3-dimethylaminopropyl]carboimide hydrochloride; DMAP: 4-dimethylaminopyridine.

Preparation Example 4

Synthesis of Intermediate 4

The following Intermediate 4 was synthesized according to the reaction conditions and methods shown in the following Reaction Formula 3:

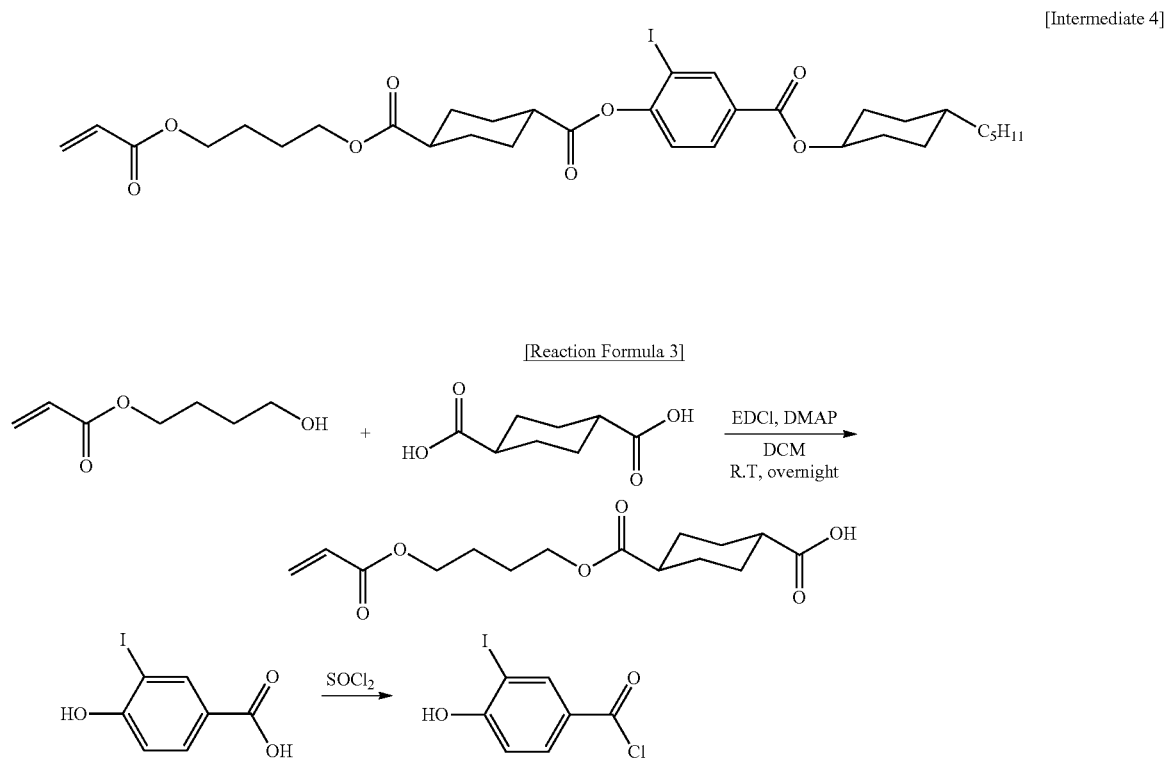

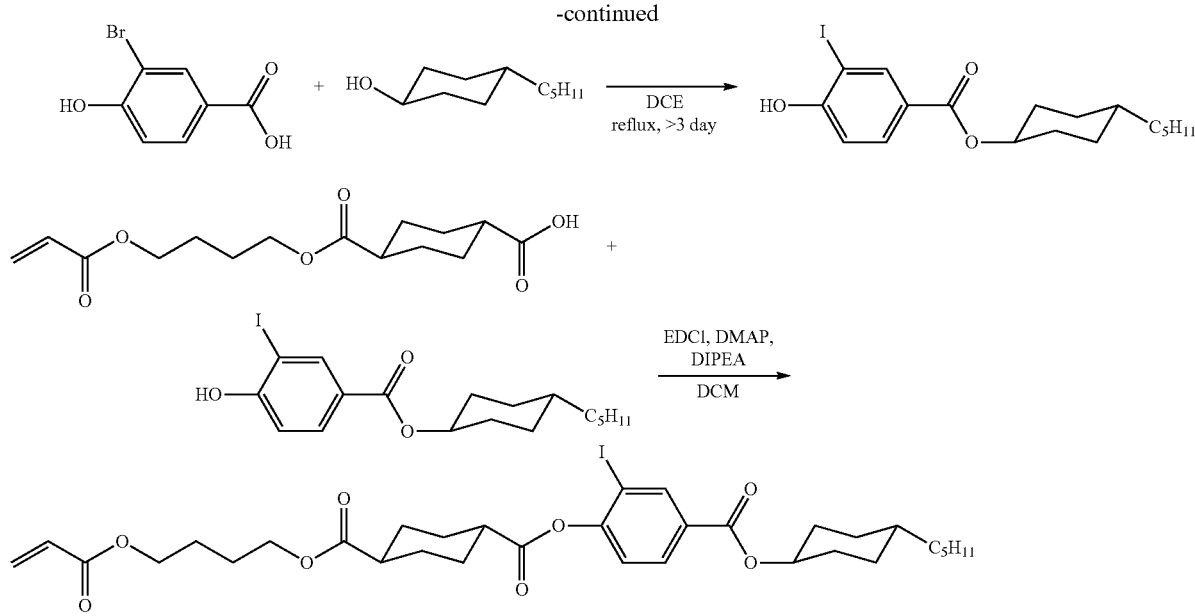

in Reaction Formula 3, each abbreviation can be defined as follows:

DMAP: 4-dimethylaminopyridine; EDCI: 1-ethyl-3-[3-dimethylaminopropyl]carboimide; DCM: dichloromethane; DIPEA: N,N'-diisopropylethylamine; R.T.: room temperature; DCE: dichloroethane.

Preparation Example 5

Synthesis of Intermediate 6

The following Intermediate 6 was synthesized according to the reaction conditions and methods shown in the following Reaction Formula 4:

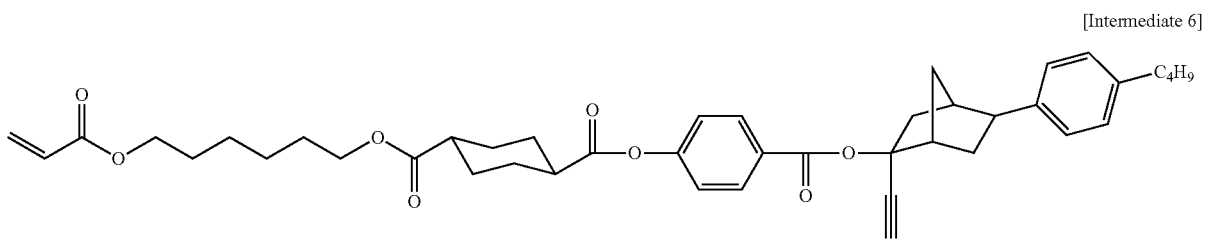

[Intermediate 6]

[Reaction Formula 4]

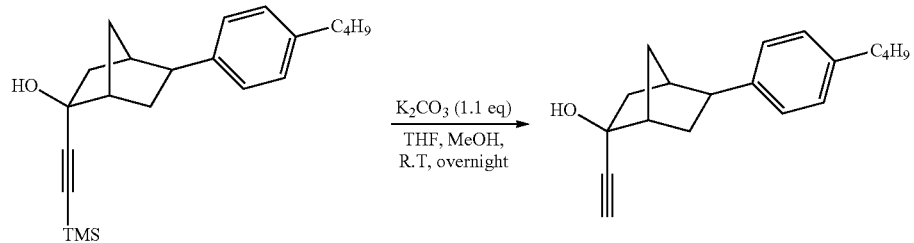

-continued
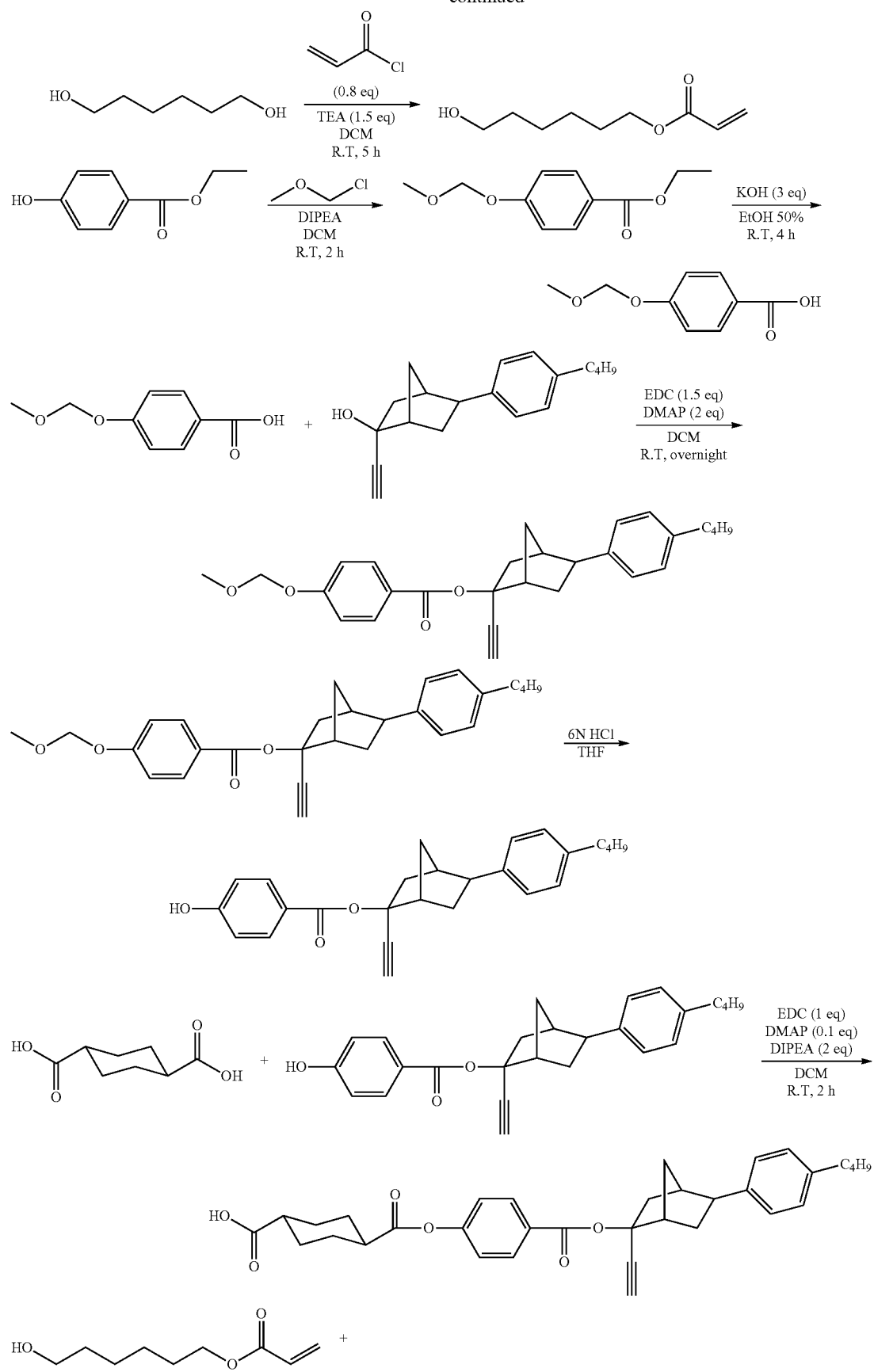

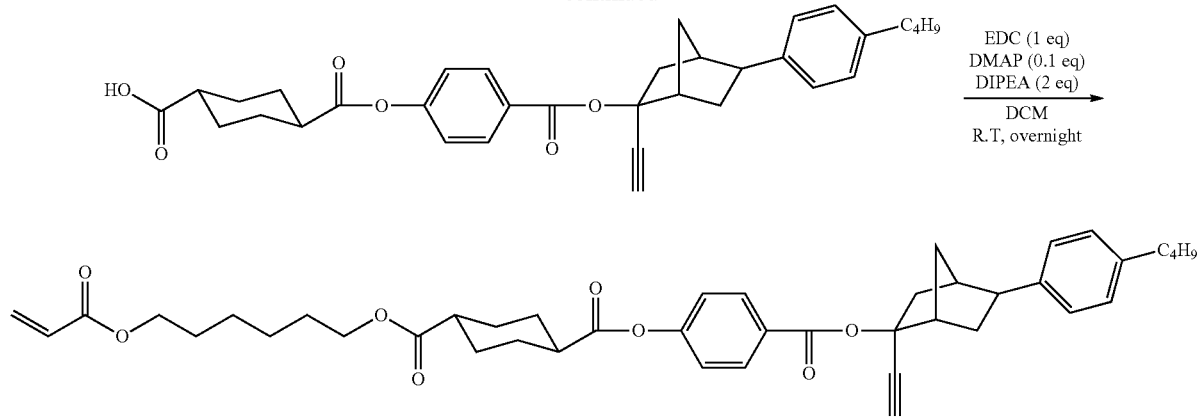

in Reaction Formula 4, each abbreviation can be defined as follows:

TEA: triethylamine; DCM: dichloromethane; DIPEA: N,N'-diisopropylethylamine; DMAP: 4-dimethylaminopyridine; EDC: 1-ethyl-3-[3-dimethylaminopropyl]carboimide hydrochloride; R.T.: room temperature.

Example 1

Preparation of the Polymerizable Liquid Crystal Compound of Chemical Formula 5

The polymerizable liquid crystal compound of Chemical Formula 5 was prepared by using Intermediate 1 obtained in Preparation Example 1 and Intermediate 3 obtained in Preparation Example 3 according to the reaction conditions and methods shown in the following Reaction Formula 5. The NMR data of the polymerizable liquid crystal compound of Chemical Formula 5 obtained like this is shown in FIG. 1:

[Chemical Formula 5]

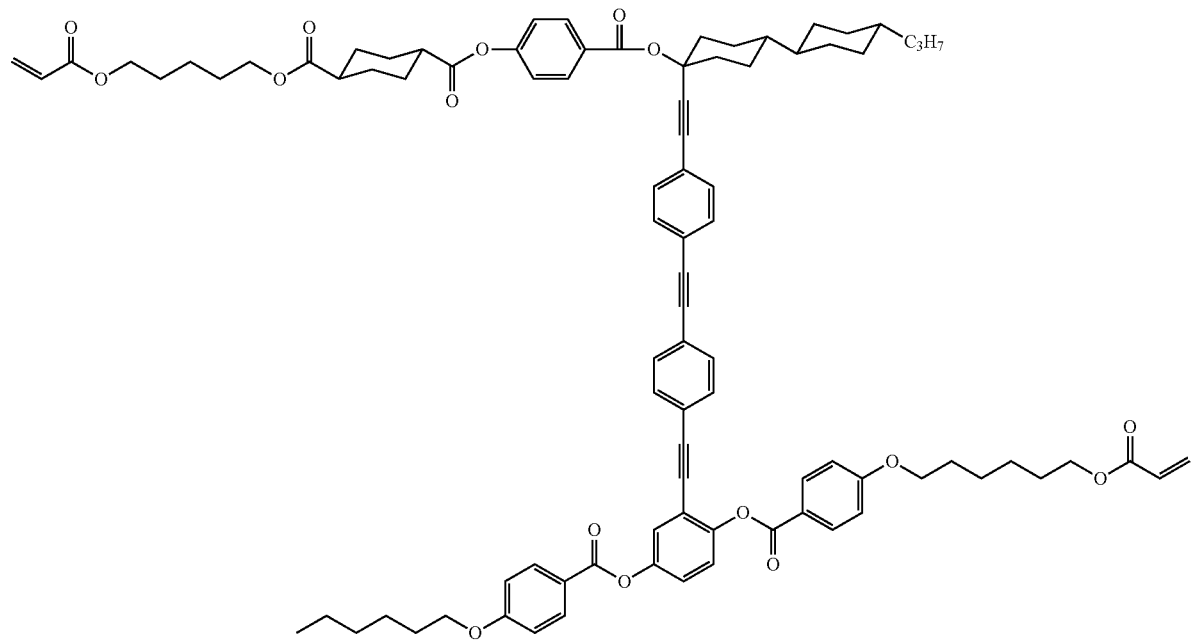

[Reaction Formula 5]
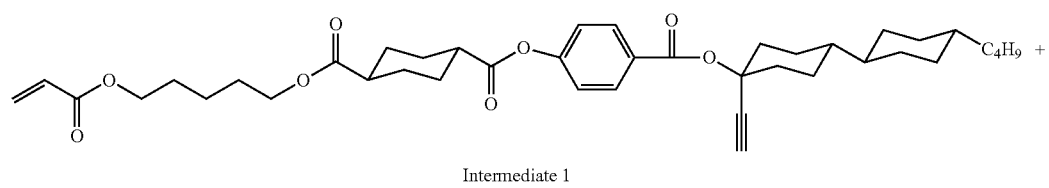
Intermediate 1
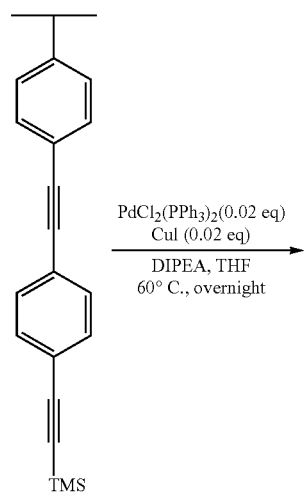
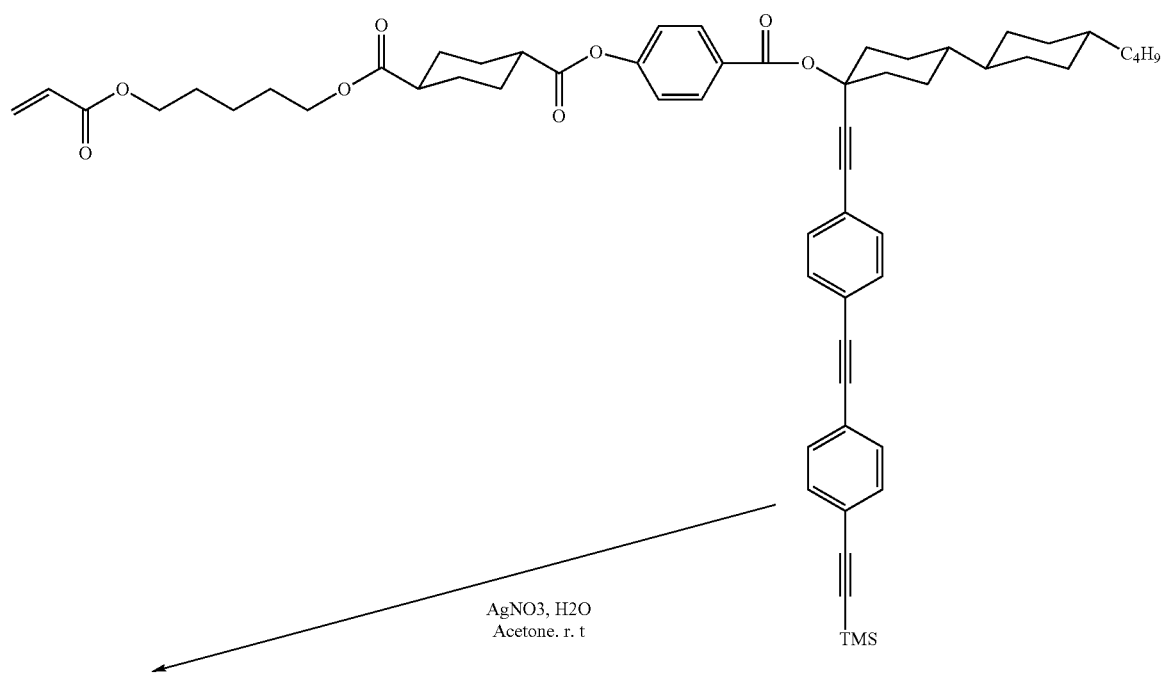

-continued
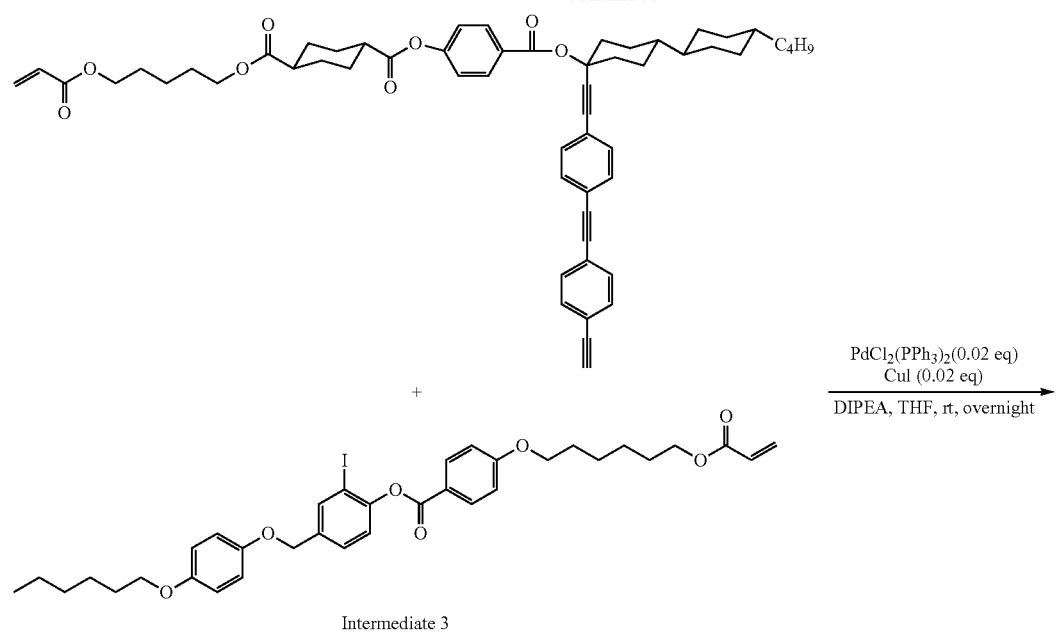
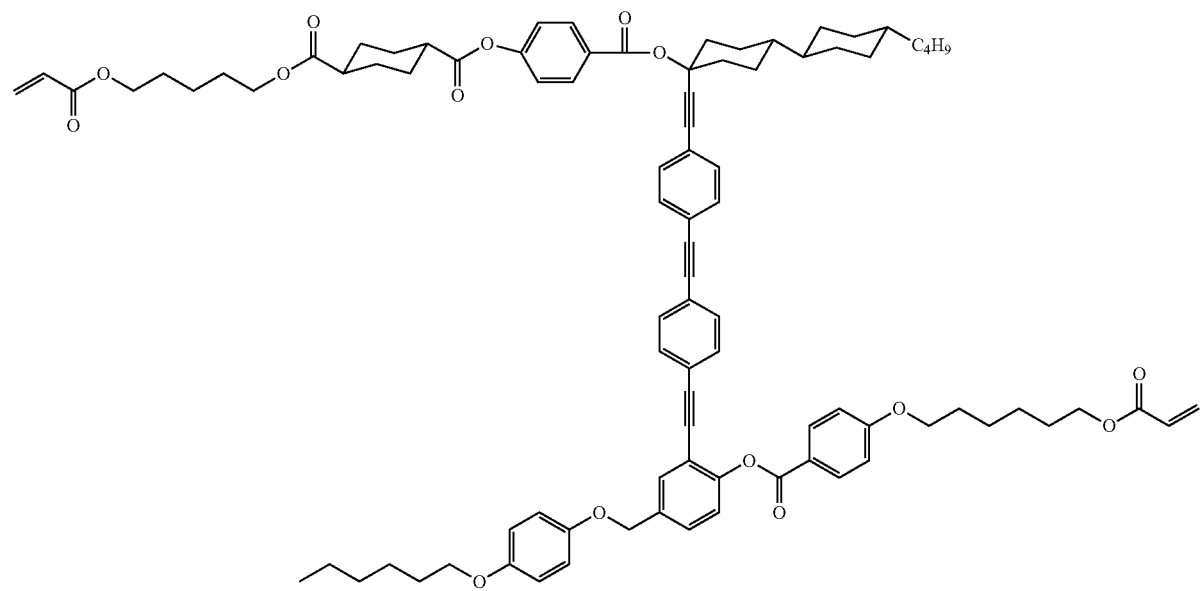

in Reaction Formula 5, DIPEA means N,N'-diisopropylethylamine.

Example 2

Preparation of the Polymerizable Liquid Crystal Compound of Chemical Formula 6

Figure 2:
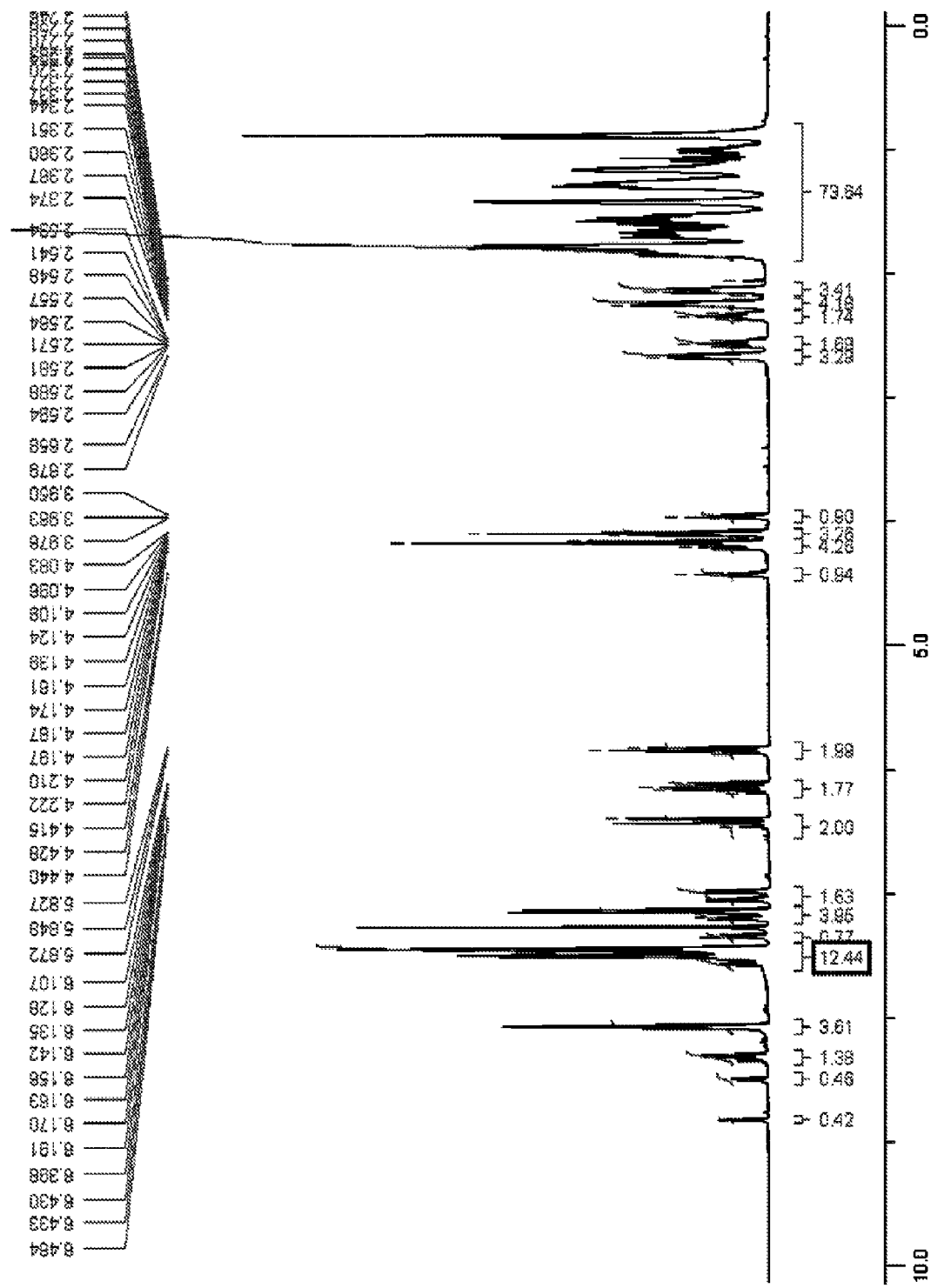

The polymerizable liquid crystal compound of Chemical Formula 6 was prepared by using Intermediate 1 obtained in Preparation Example 1 according to the reaction conditions and methods shown in the following Reaction Formula 6. The NMR data of the polymerizable liquid crystal compound of Chemical Formula 6 obtained like this is shown in FIG. 2:

[Chemical Formula 6]

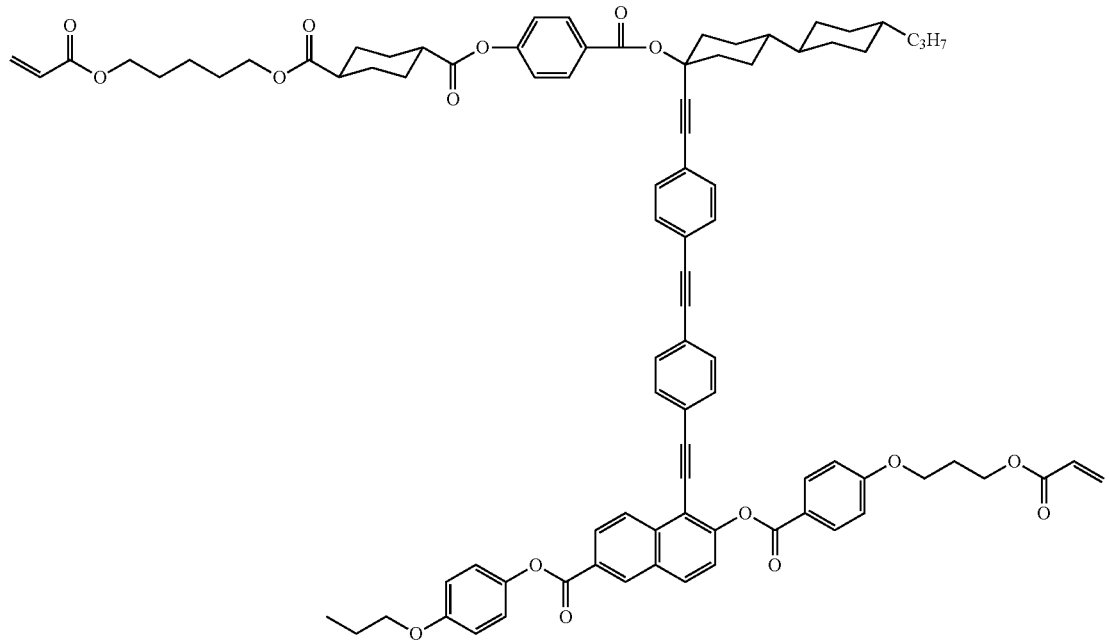

[Reaction Formula 6]

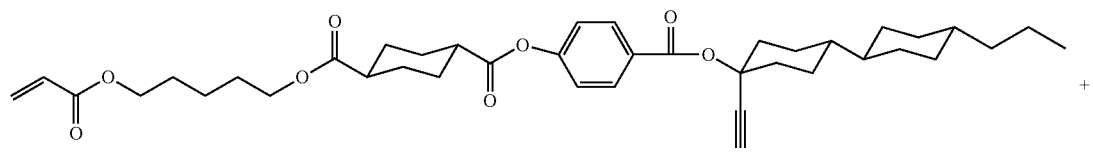

Intermediate 1

-continued
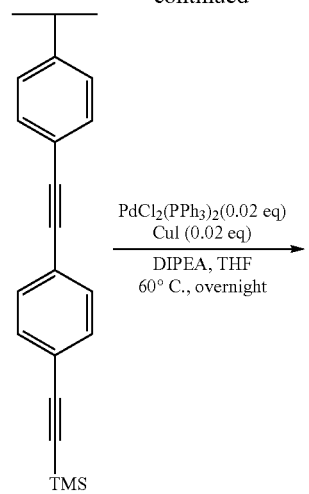
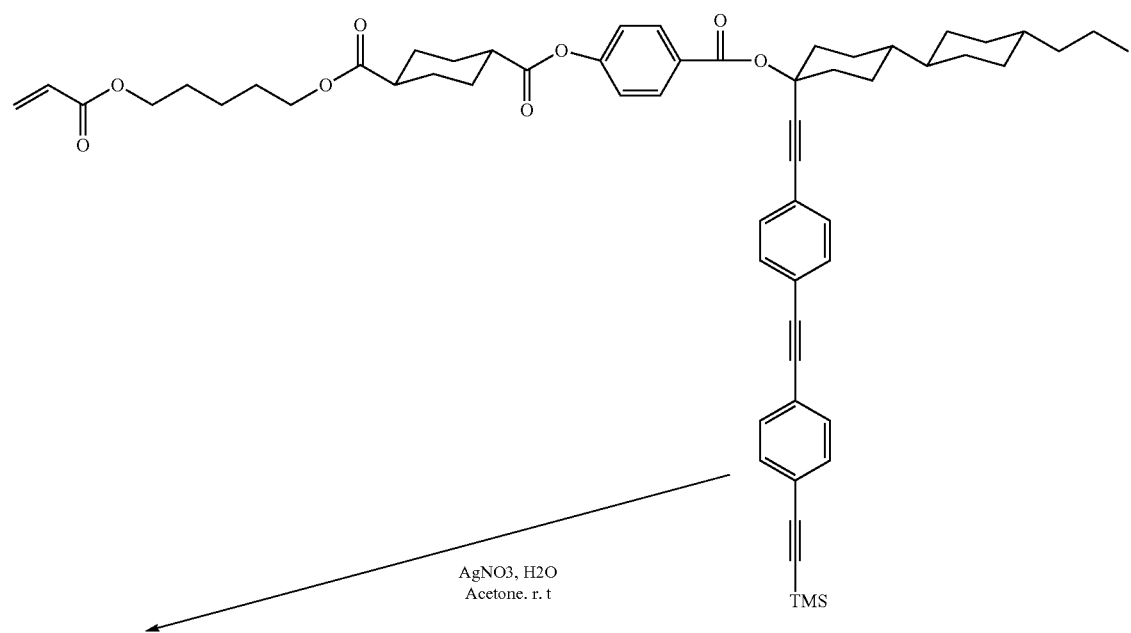

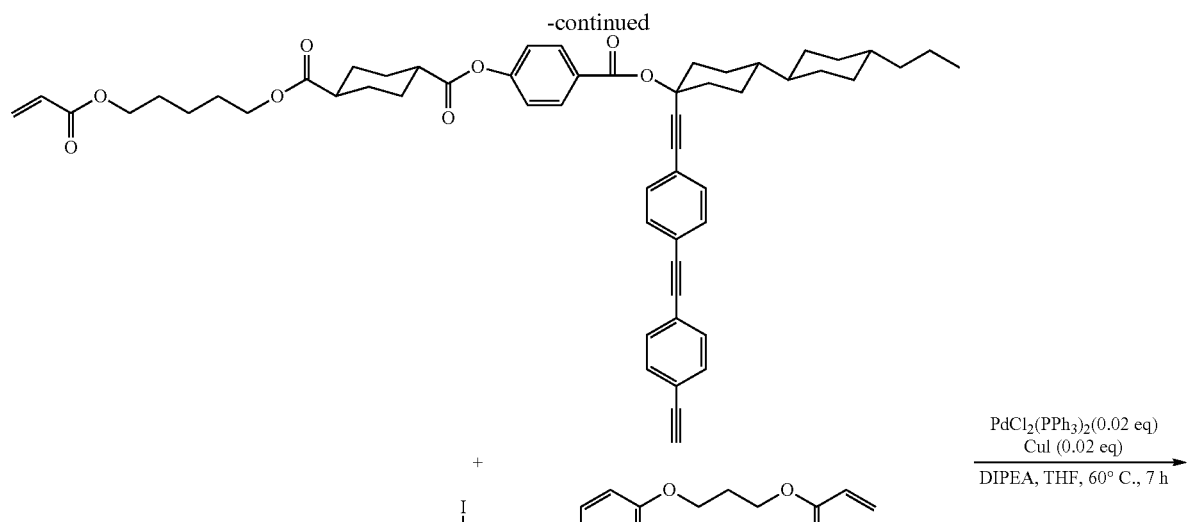

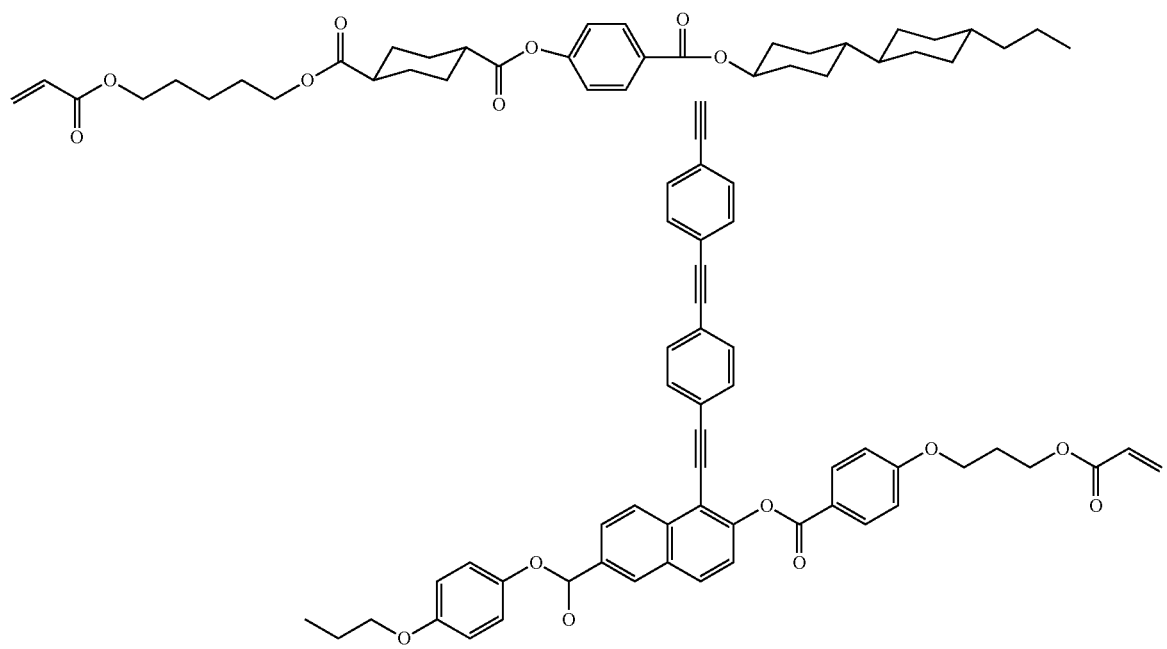

in Reaction Formula 6, DIPEA means N,N'-diisopropylethylamine.

Example 3

Preparation of the Polymerizable Liquid Crystal Compound of Chemical Formula 7

The polymerizable liquid crystal compound of Chemical Formula 7 was prepared by using Intermediate 2 obtained in Preparation Example 2 and Intermediate 4 obtained in Preparation Example 4 according to the reaction conditions and methods shown in the following Reaction Formula 7. The formation of the polymerizable liquid crystal compound of Chemical Formula 7 was recognized from NMR data.

[Chemical Formula 7]
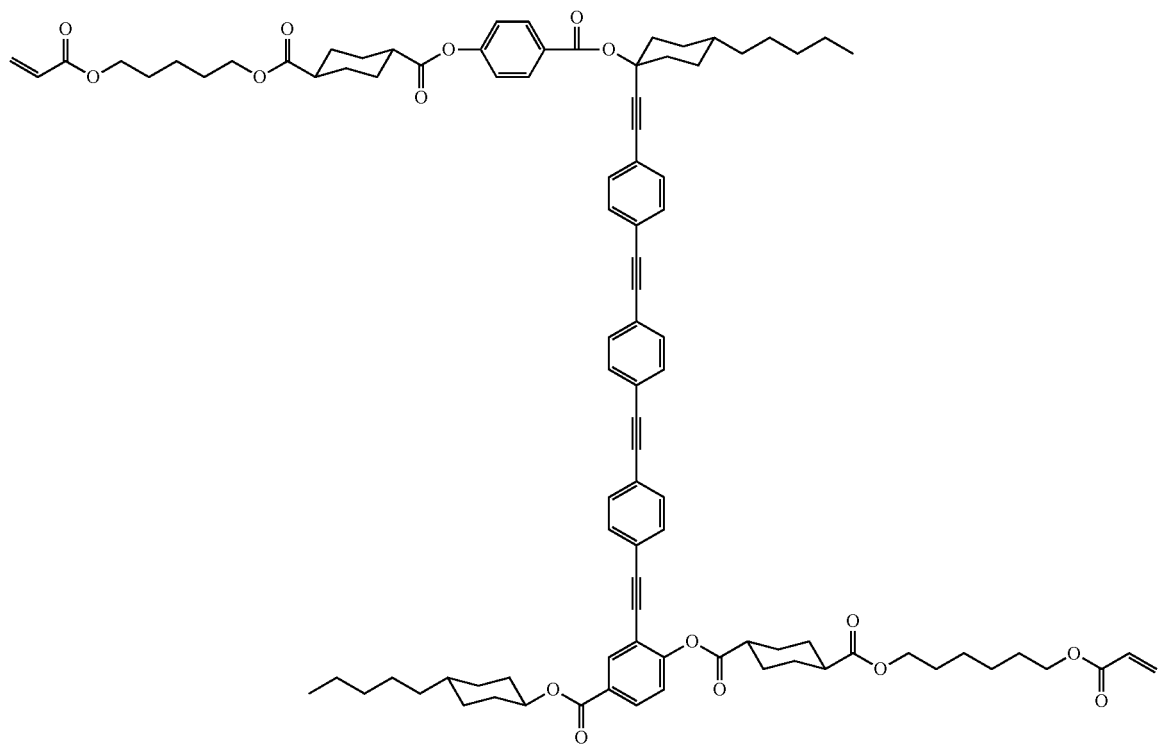
[Reaction Formula 7]
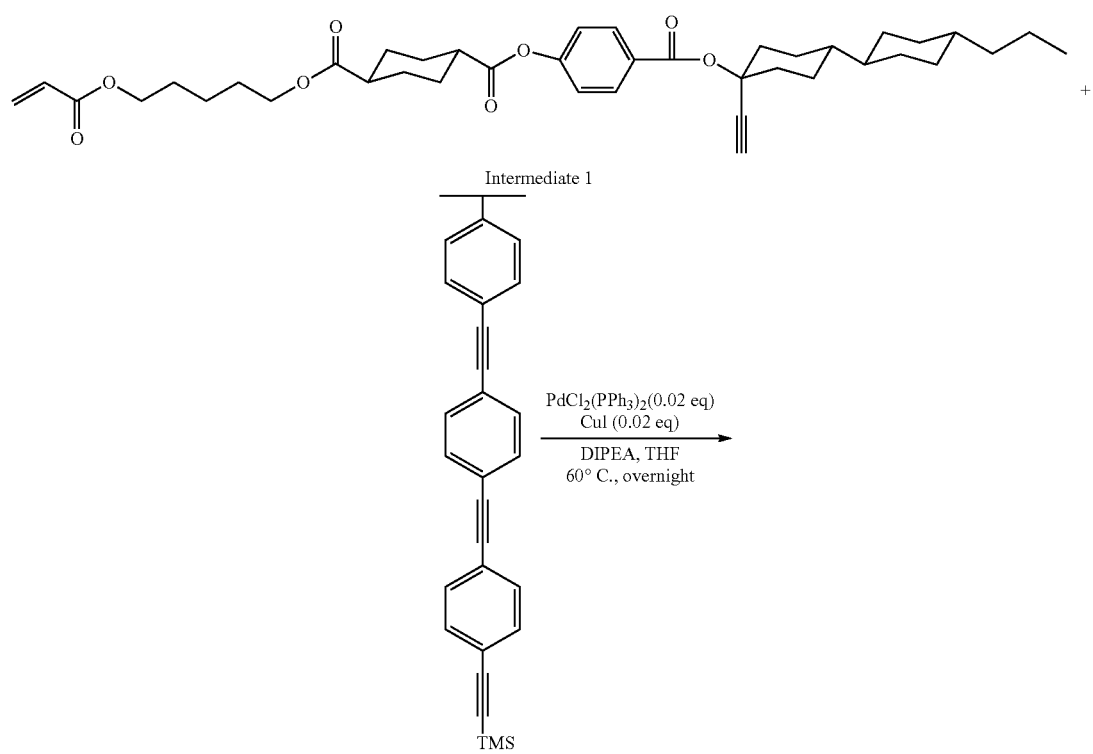

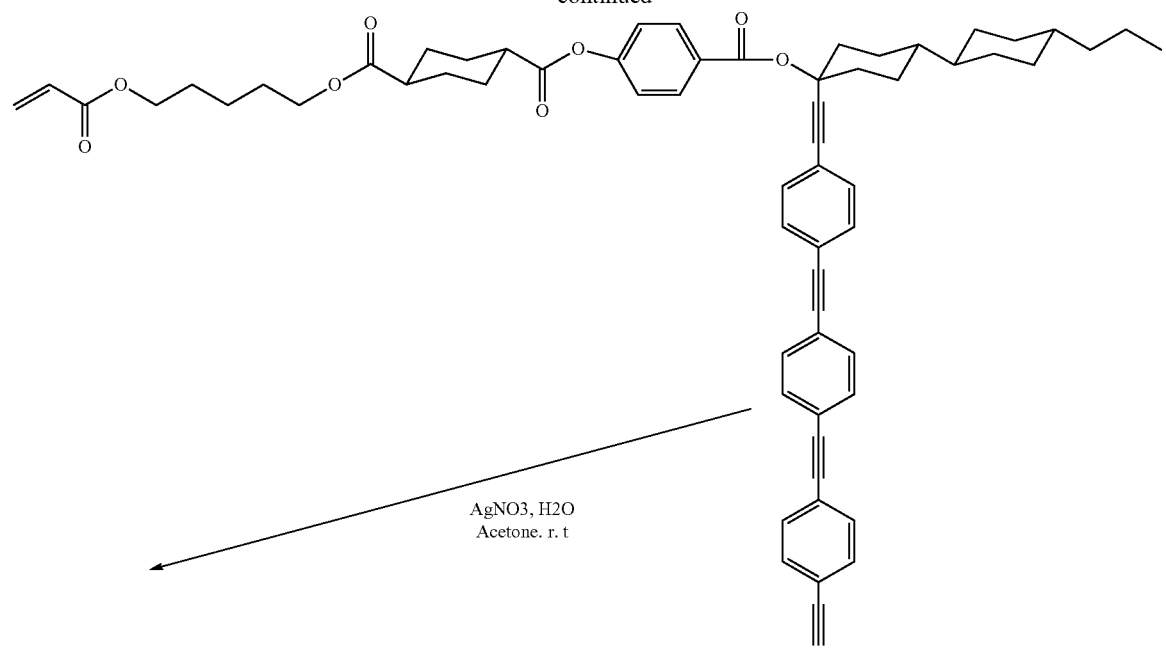
AgNO3, H2O
Acetone. r. t
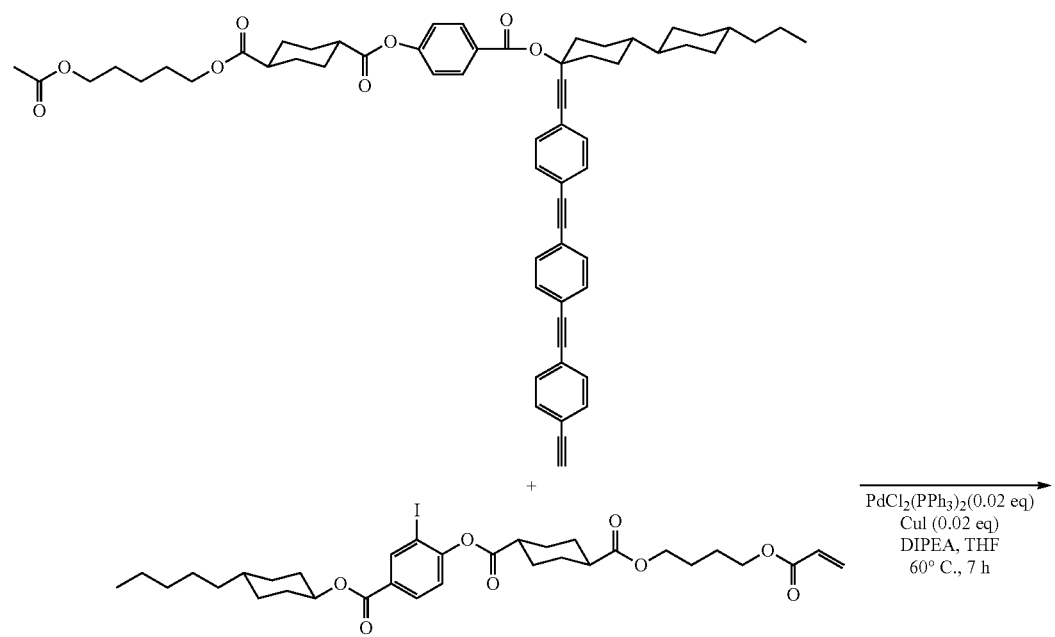
PdCl$_2$(PPh$_3$)$_2$(0.02 eq)
CuI (0.02 eq)
DIPEA, THF
60° C., 7 h

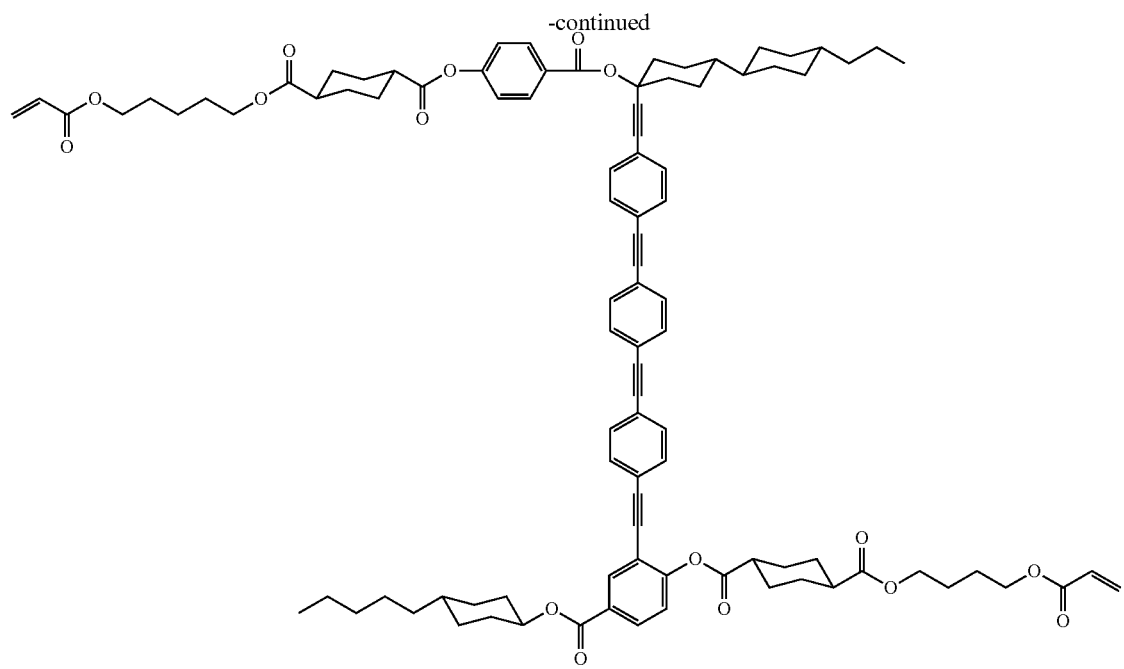

in Reaction Formula 7, DIPEA means N,N"-diisopropylethylamine.

Example 4

Preparation of the Polymerizable Liquid Crystal Compound of Chemical Formula 8

The polymerizable liquid crystal compound of Chemical Formula 8 was prepared substantially according to the same methods and conditions as in Reaction Formula 7 of Example 3, except that the following known Intermediate 5 was used instead of Intermediate 4 and

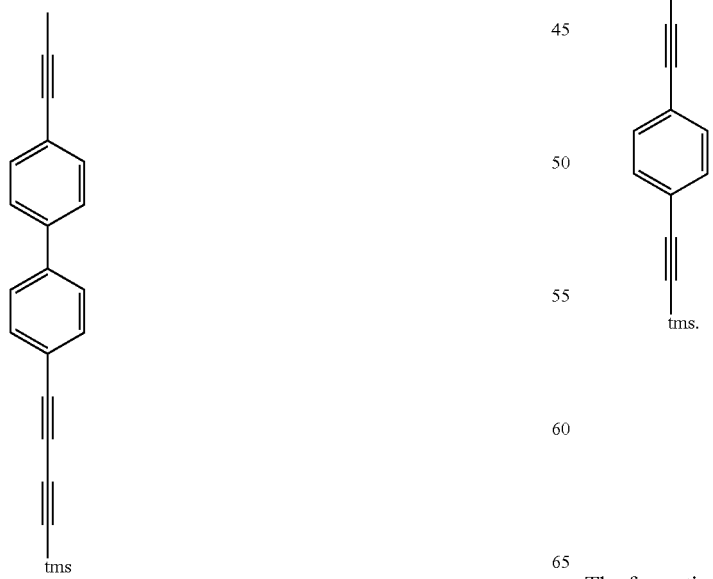

was used instead of

The formation of the polymerizable liquid crystal compound of Chemical Formula 8 was recognized from NMR data.

Intermediate 5

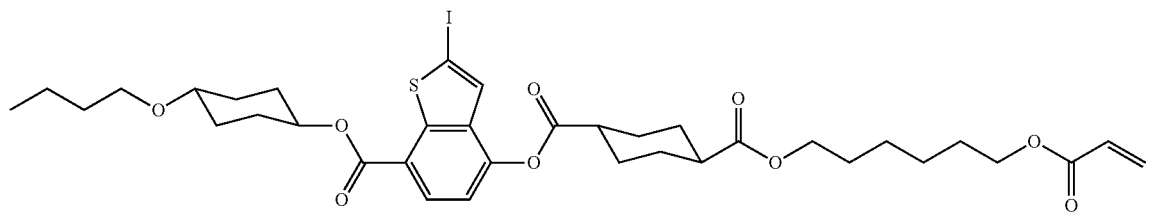 [SMILES: C=CC(=O)OCCCCCCOC(=O)C1CCC(C(=O)Oc2ccc(C(=O)OC3CCC(OCCCC)CC3)c3sc(I)cc23)CC1]

Example 5

Preparation of the Polymerizable Liquid Crystal Compound of Chemical Formula 9

The polymerizable liquid crystal compound of Chemical Formula 9 was prepared by using Intermediate 3 obtained in Preparation Example 3 and Intermediate 6 obtained in Preparation Example 5 according to the reaction conditions and methods shown in the following Reaction Formula 8. The formation of the polymerizable liquid crystal compound of Chemical Formula 9 was recognized from NMR data.

[Chemical Formula 8]

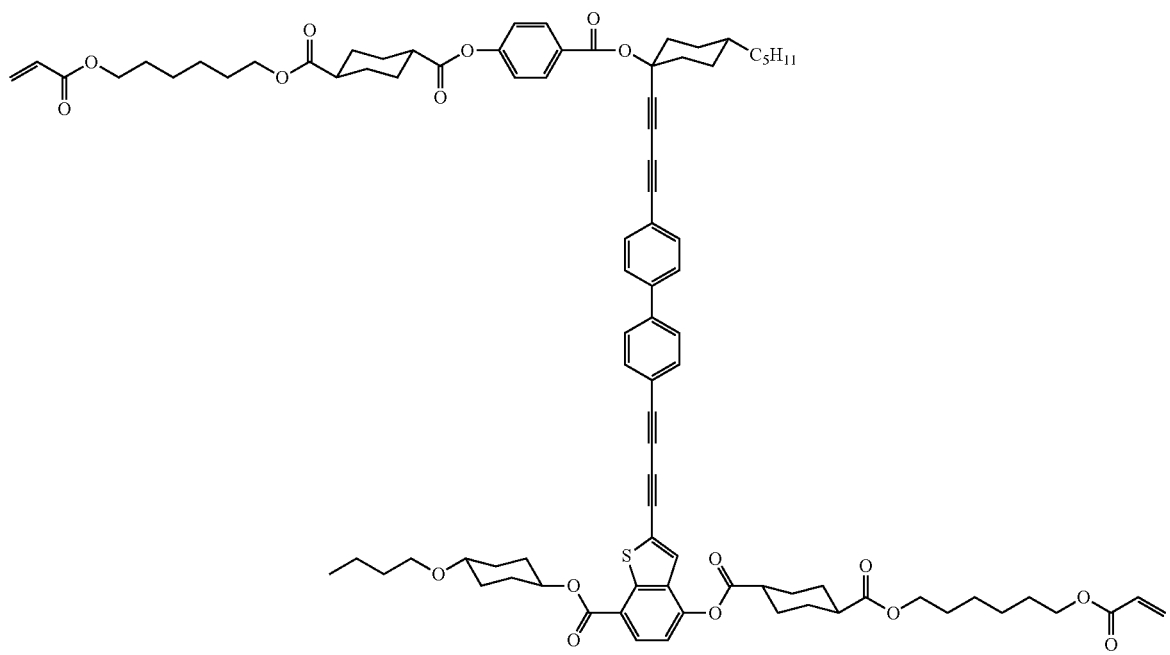

[Chemical Formula 9]
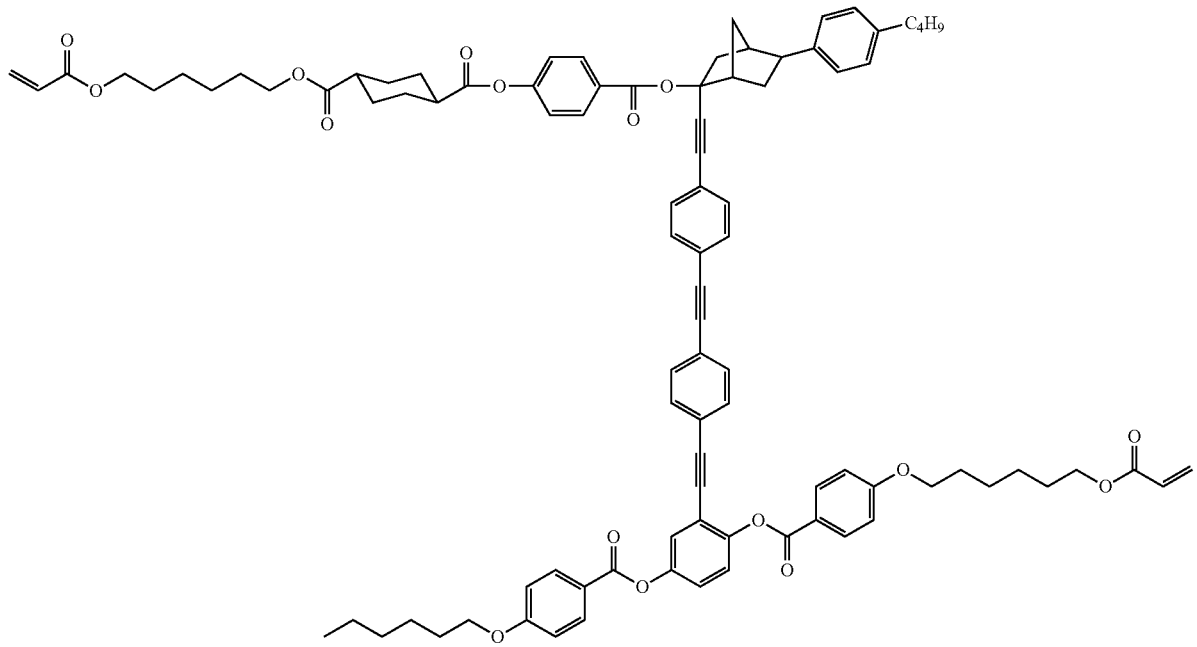
[Reaction Formula 8]
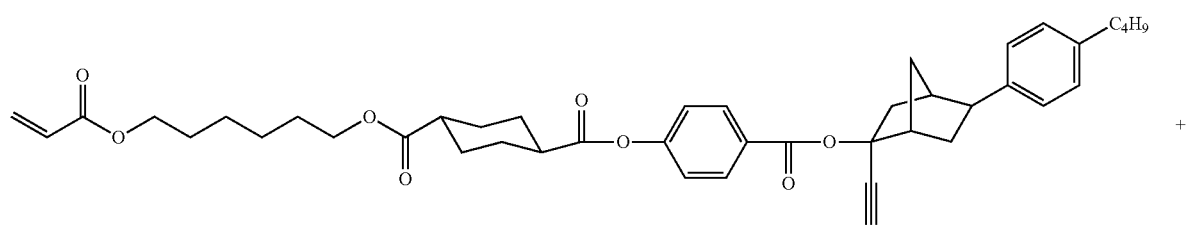
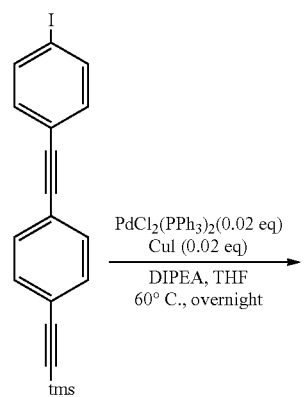

-continued
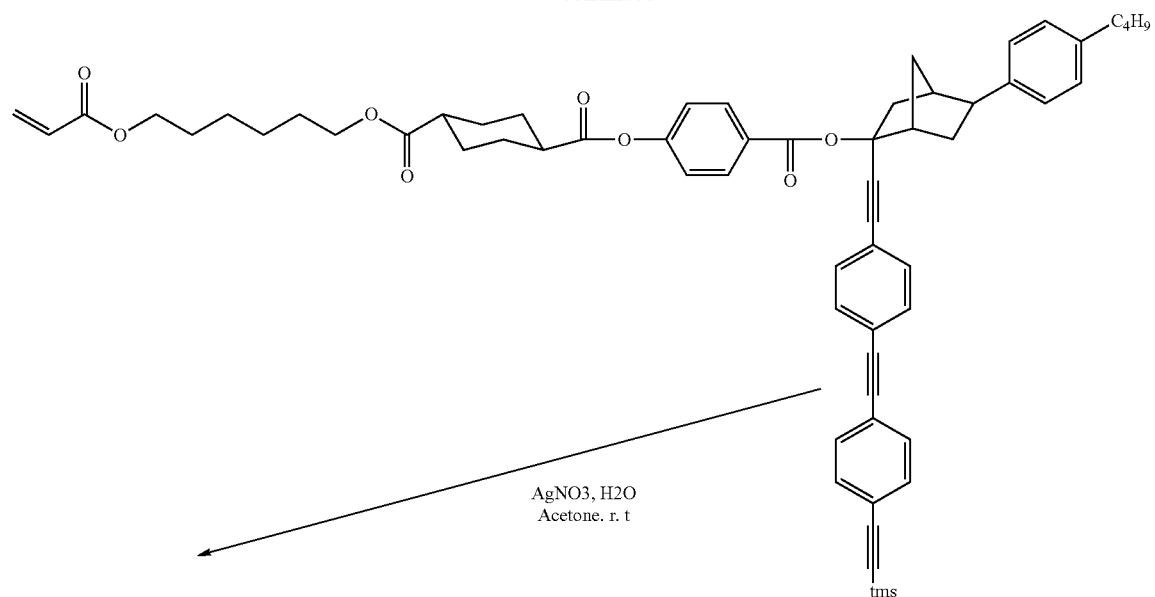
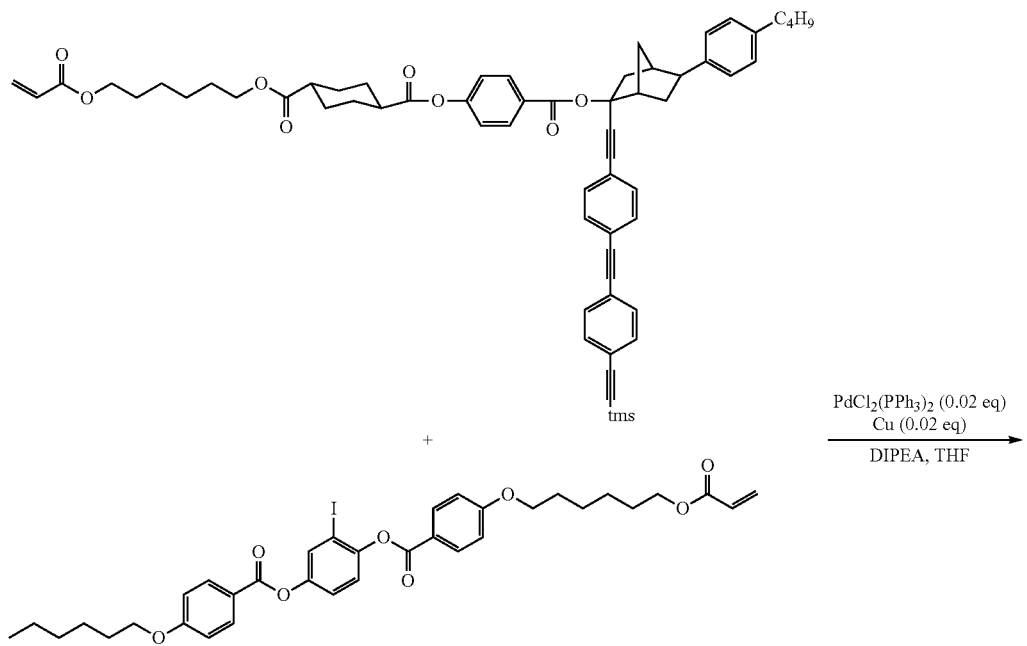

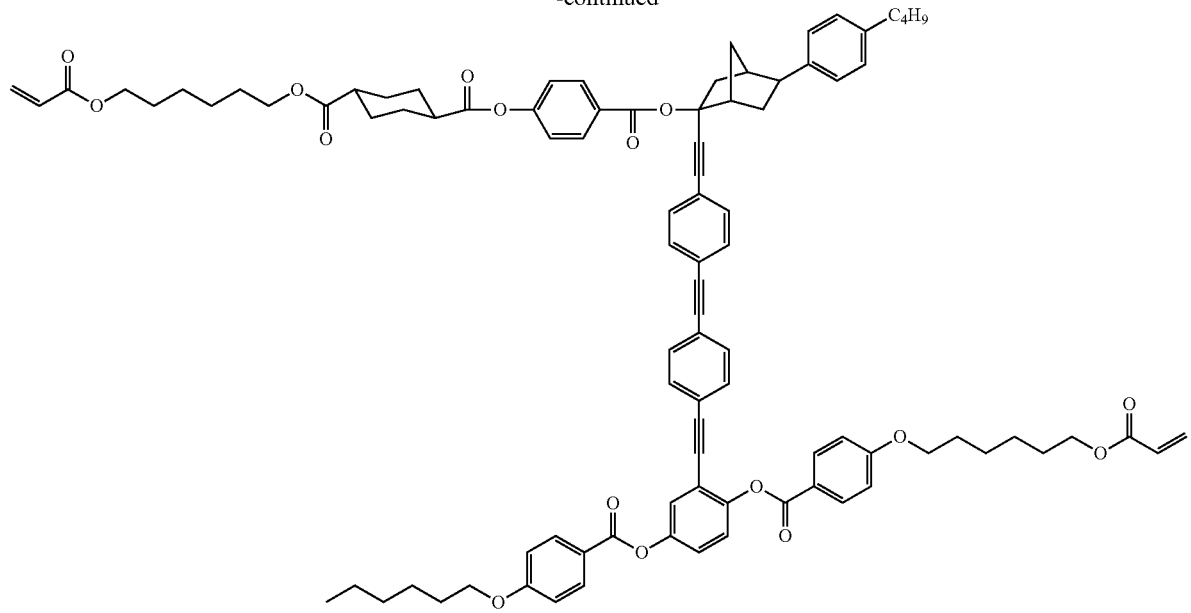

in Reaction Formula 8, DIPEA means N,N'-diisopropylethylamine.

Example 6

Preparation of Polymerizable Liquid Crystal Composition

The liquid crystal composition was prepared by mixing 39.68 weight % of the polymerizable liquid crystal compound of Chemical Formula 5 obtained in Example 1, 18.01 weight % of the liquid crystal compound of the following Chemical Formula 30, 15.83 weight % of the liquid crystal compound of the following Chemical Formula 31, 24.14 weight % of the liquid crystal compound of the following Chemical Formula 32, 1.39 weight % of photoinitiator (Irgacure 651), and 0.96 weight %/o of surfactant.

After dissolving 5-norbornene-2-ethyl-(4-methyl cinnamate) polymer (Mw-163,000) in c-pentanone solvent to be the concentration of 2 weight %, the solution was coated on a polyethylene terephthalate (Product Name: SH71, made by SKC co., ltd.) substrate of 80 μm thickness with a roll coating method so that the dried thickness thereof became 1,000 Å. After then, the coating layer was formed by heating the coated layer in an oven of 80° C. for 3 minutes for eliminating the solvent included in the same.

The photo-alignment layer was formed by exposing the coating layer to the polarized UV ray for 5 seconds for giving alignment thereto, wherein the light source of the UV ray was a high pressure mercury lamp of 200 mW/cm² intensity and the UV ray was polarized by using a wire grid polarizer of Moxtek co., ltd. to be perpendicular to the direction of progress of the film.

Meanwhile, the polymerizable liquid crystal composition was prepared by dissolving the liquid crystal composition

[Chemical Formula 30]

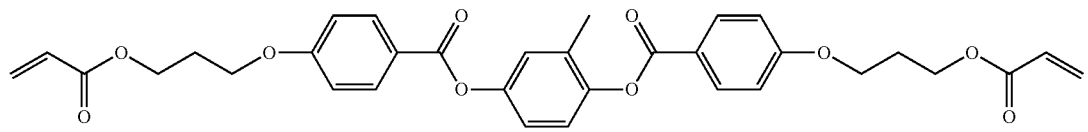

[Chemical Formula 31]

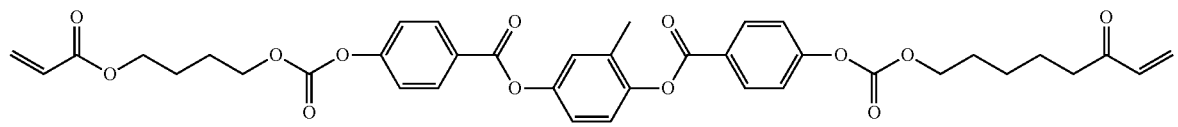

[Chemical Formula 32]

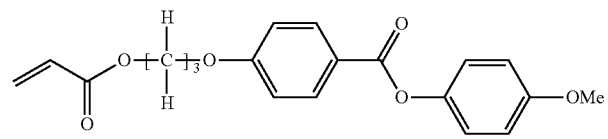

prepared above in toluene so that the concentration of the liquid crystal was 30 parts by weight per 100 parts by weight of the liquid crystal solution.

The polymerizable liquid crystal composition was coated on the photo-alignment layer formed above by a roll coating method so that the dried thickness thereof became 1 μm, and then the liquid crystal layer was obtained by drying the same at 80° C. for 2 minutes for aligning the liquid crystal molecules. The optically anisotropic body of film type including the photo-alignment layer and the liquid crystal layer was prepared by exposing the aligned liquid crystal layer to non-polarized UV ray of which the light source of the UV ray was a high pressure mercury lamp of 200 mW/cm$^2$ intensity for fixating the aligned state of the liquid crystal.

Figure 3:
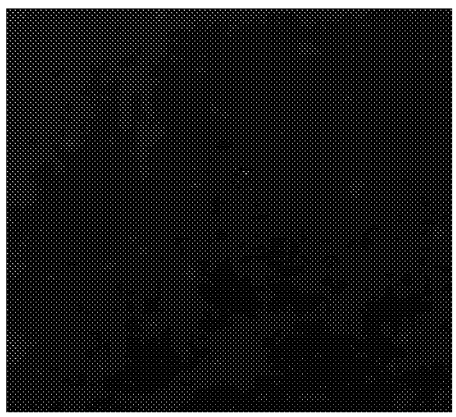
FIGS. 3, 5, and 6 show the photographs of the optically anisotropic bodies of film type obtained in Examples 6 to 8 which are positioned between two perpendicular polarizing plates for identifying the orientation of the same.

It was recognized that the optically anisotropic body had the optical characteristic of A-plate and showed the reverse wavelength dispersion characteristic of R(450 nm)/R(550 nm)=0.971. Furthermore, the optically anisotropic body of film type was positioned between two perpendicular polarizing plates and the photograph thereof was taken and shown in FIG. 3 for identifying the overall orientation of the optically anisotropic body. Referring to FIG. 3, it was recognized that there was no leaking light phenomenon on the whole and the alignment was excellent and uniform.

Comparative Example 1

Preparation of Polymerizable Liquid Crystal Composition

The polymerizable liquid crystal composition, the photo-alignment layer, the liquid crystal layer, and the optically anisotropic body were prepared substantially according to the same methods as in Example 6, except that the symmetric polymerizable liquid crystal compound of Comparative Chemical Formula 1 having the structure that the linker connects the sp3-hybridized carbons of the radicals derived from each liquid crystal molecule was used instead of the polymerizable liquid crystal compound of Chemical Formula 5 obtained in Example 1.

Here, methylene chloride was used as the solvent because the polymerizable liquid crystal compound of Comparative Chemical Formula 1 had very low solubility to toluene.

[Comparative Chemical Formula 1]

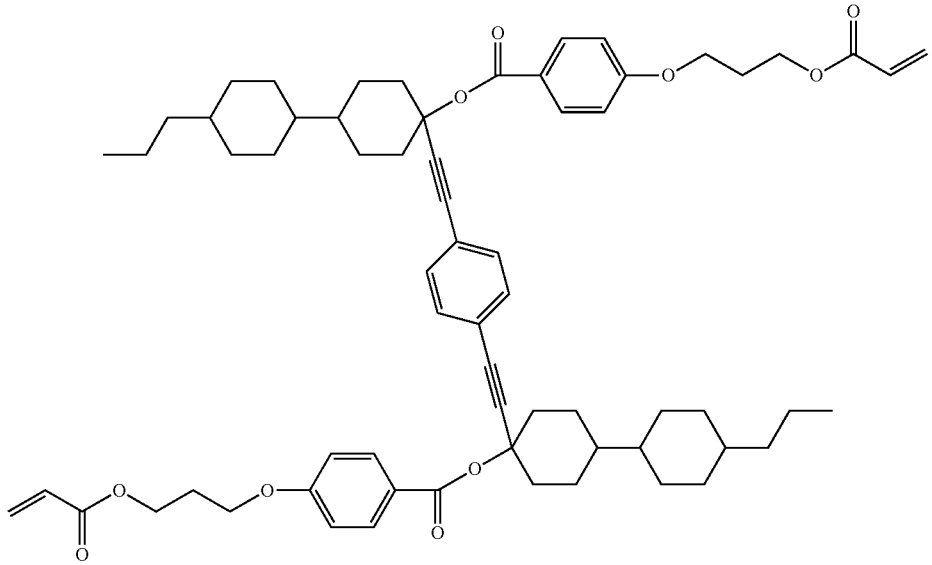

It was recognized that the optically anisotropic body had the optical characteristic of A-plate and showed the reverse wavelength dispersion characteristic of R(450 nm)/R(550 nm)=0.994. However, it was also recognized that the value of R(450 nm)/R(550 nm) was close to about 1.0 and the reverse wavelength dispersion characteristic did not be realized properly in comparison with Example 6.

Figure 4:
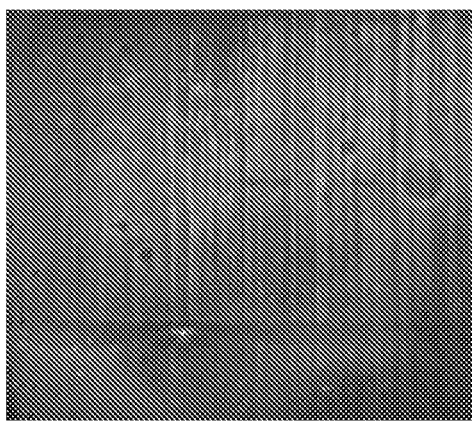
FIG. 4 shows the photograph of the optically anisotropic body of film type obtained in Comparative Example 1 which is positioned between two perpendicular polarizing plates.

Furthermore, the optically anisotropic body of film type was positioned between two perpendicular polarizing plates and the photograph thereof was taken and shown in FIG. 4 for identifying the overall orientation of the optically anisotropic body. Referring to FIG. 4, it was recognized that there was considerable leaking light phenomenon and the alignment and uniformity of the alignment were inferior.

Example 7

Preparation of Polymerizable Liquid Crystal Composition

The liquid crystal composition was prepared by mixing 41.05 weight % of the polymerizable liquid crystal compound of Chemical Formula 6 obtained in Example 2, 10.71 weight % of the liquid crystal compound of Chemical Formula 30, 16.94 weight % of the liquid crystal compound of Chemical Formula 31, 29.24 weight % of the liquid crystal compound of Chemical Formula 32, 0.99 weight % of photoinitiator (Irgacure 651), and 0.96 weight % of surfactant.

The polymerizable liquid crystal composition, the photo-alignment layer, the liquid crystal layer, and the optically anisotropic body were prepared by carrying out the subsequent steps according to the same methods as in Example 6.

Figure 5:
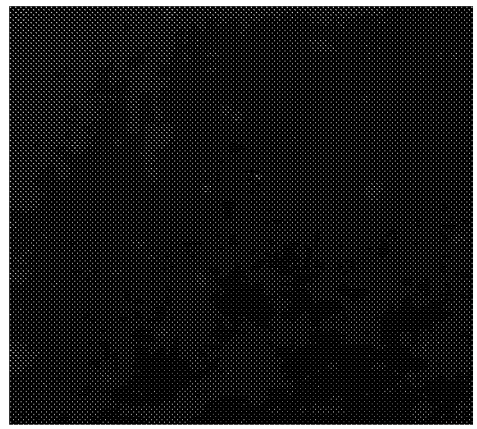

It was recognized that the optically anisotropic body had the optical characteristic of A-plate and showed the reverse wavelength dispersion characteristic of R(450 nm)/R(550 nm)=0.970. Furthermore, the optically anisotropic body of film type was positioned between two perpendicular polarizing plates and the photograph thereof was taken and shown in FIG. 5 for identifying the overall orientation of the optically anisotropic body. Referring to FIG. 5, it was recognized that there was no leaking light phenomenon on the whole and the alignment was excellent and uniform.

Example 8

Preparation of Polymerizable Liquid Crystal Composition

The liquid crystal composition was prepared by mixing 33.67 weight % of the polymerizable liquid crystal compound of Chemical Formula 7 obtained in Example 3, 31.08 weight % of the liquid crystal compound of Chemical Formula 31, 32.87 weight % of the liquid crystal compound of Chemical Formula 32, 0.99 weight % of photoinitiator (Irgacure 651), and 0.96 weight % of surfactant.

The polymerizable liquid crystal composition, the photo-alignment layer, the liquid crystal layer, and the optically anisotropic body were prepared by carrying out the subsequent steps according to the same methods as in Example 6.

Figure 6:
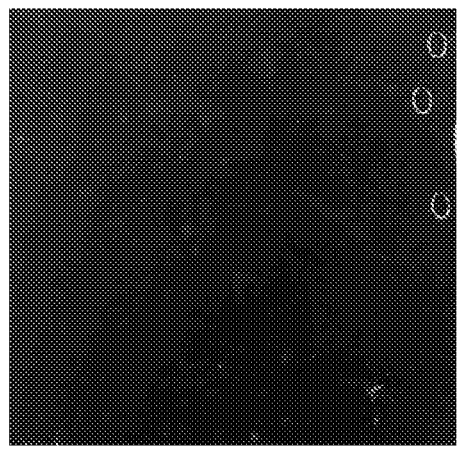

It was recognized that the optically anisotropic body had the optical characteristic of A-plate and showed the reverse wavelength dispersion characteristic of R(450 nm)/R(550 nm)=0.982. Furthermore, the optically anisotropic body of film type was positioned between two perpendicular polarizing plates and the photograph thereof was taken and shown in FIG. 6 for identifying the overall orientation of the optically anisotropic body. Referring to FIG. 6, it was recognized that there was no leaking light phenomenon on the whole and the alignment was excellent and uniform.

The invention claimed is:

1. An optically anisotropic body, including a cured material or a polymer obtained from a polymerizable liquid crystal composition including a polymerizable liquid crystal compound, wherein the polymerizable liquid crystal compound includes:

a radical derived from the first liquid crystal molecule including a mesogen group having a non-aromatic ring;

a radical derived from the second liquid crystal molecule including a mesogen group that has a structure different from said mesogen group having a non-aromatic ring and includes a ring containing a double bond; and a linker represented by the following General Formula 1 that links the sp3-hybridized carbon in the non-aromatic ring of the radical derived from the first liquid crystal molecule and the sp2-hybridized carbon in the mesogen group of the radical derived from the second liquid crystal molecule, wherein at least one of the radicals derived from the first and the second liquid crystal molecules includes one or more polymerizable groups which are connected to the mesogen group directly or via spacer groups:

[General Formula 1]

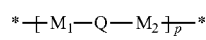

in General Formula 1, $M_1$ and $M_2$ are independently a single bond, —C≡C—, —C≡C—C≡C—, an arylene group, or a heteroarylene group; Q is —C≡C—, —$CR_4$=$CR_5$—, an arylene group, a heteroarylene group, or a divalent functional group that two or more of these groups are combined; one or more of $M_1$, $M_2$, and Q include —C≡C—, —C≡C—C≡C—, an arylene group, or a heteroarylene group; and $R_4$ and $R_5$ are independently H, F, Cl, CN, a $C_1$-$C_{10}$ alkyl group, or a $C_1$-$C_{10}$ acyl group; and p is an integer of 1 to 4, and each of 1 to 4 repeating units may be independently same to or different from each other.

2. The optically anisotropic body according to claim 1, wherein the polymerizable liquid crystal compound is represented by the following Chemical Formula 1, 2, 3, or 4:

[Chemical Formula 1]

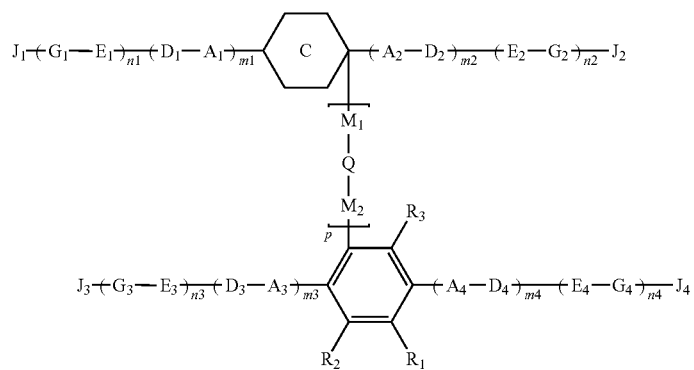

-continued

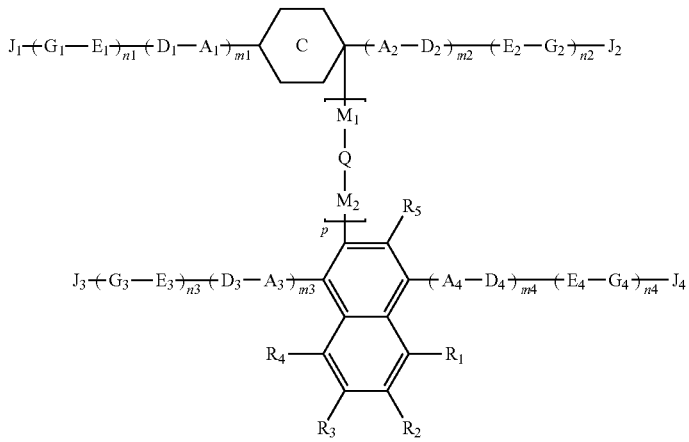

[Chemical Formula 2]

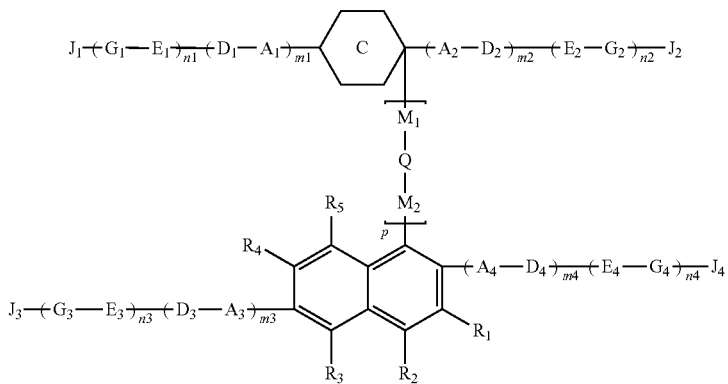

[Chemical Formula 3]

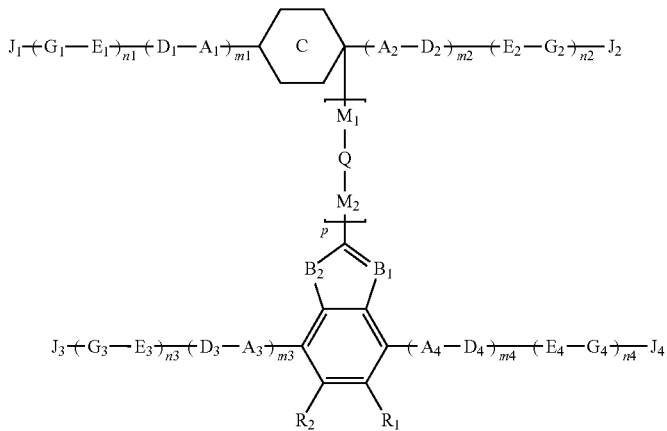

[Chemical Formula 4]

in Chemical Formulae 1 to 4, ring C is a non-aromatic ring of an aliphatic 6 member ring including or not including one or more oxygen or silicon, norbornene ring, camphor ring, or adamantine ring;

$A_1, A_2, A_3, A_4, E_1, E_2, E_3$, and $E_4$ are independently a single bond or a divalent connecting group;

$D_1, D_2, D_3$, and $D_4$ are independently a divalent functional group including one or more rings selected from the group consisting of a substituted or non-substituted aromatic ring, a substituted or non-substituted aliphatic ring, a substituted or non-substituted heteroaliphatic ring, and a substituted or non-substituted heteroaromatic ring;

$G_1, G_2, G_3$, and $G_4$ are independently a single bond or an alkylene group;

$J_1, J_2, J_3$, and $J_4$ are independently hydrogen or a polymerizable group and at least one of $J_1$ and $J_2$ and at least one of $J_3$ and $J_4$ are polymerizable functional groups;

$M_1$ and $M_2$ are independently a single bond, —C≡C—, —C≡C—C≡C—, an arylene group, or a heteroarylene group; Q is —C≡C—, —CR$_4$=CR$_5$—, an arylene group, a heteroarylene group, or a divalent functional group that two or more of these groups are combined; one or more of $M_1$, $M_2$, and Q include —C≡C—, —C≡C—C≡C—, an arylene group, or a heteroarylene group; and $R_4$ and $R_5$ are independently H, F, Cl, CN, a $C_1$-$C_{10}$ alkyl group, or a $C_1$-$C_{10}$ acyl group;

p is an integer of 1 to 4, and each of p repeating units may be independently same to or different from each other;

$R_1$ to $R_5$ are independently hydrogen, a halogen, —CN, an alkyl group, or an acyl group;

$B_1$ is N or P, and $B_2$ is O or S; and m1, m2, m3, m4, n1, n2, n3, and n4 are independently an integer of 1 to 5.

3. The optically anisotropic body according to claim 1, wherein the polymerizable liquid crystal composition further includes one or more additional liquid crystal compounds having a structure different from the polymerizable liquid crystal compound.

4. The optically anisotropic body according to claim 1, including the cured material or the polymer in which at least part of the polymerizable groups of the polymerizable liquid crystal compound are crosslinked or addition-polymerized.

5. The optically anisotropic body according to claim 1, which is membrane or film type.

6. The optically anisotropic body according to claim 5, wherein the membrane or film type optically anisotropic body satisfies the following Equations V and VI:

$$R_{(\lambda 1)}/R_{(550nm)} \leq 1.0 \quad \text{(Equation V)}$$

$$R_{(650nm)}/R_{(\lambda 2)} \geq 1.0 \quad \text{(Equation VI)}$$

in Equations V and VI, $R(\lambda)$ is the phase difference on optical axis at the wavelength $\lambda$ that is defined as $|\Delta n(\lambda)| \cdot d$, $\Delta n(\lambda)$ means a birefringence at the wavelength $\lambda$ in the liquid crystal phase, d means the thickness (nm) of the membrane or film, $\lambda 1$ means the wavelength of 450 nm or more and less than 550 nm, and $\lambda 2$ means the wavelength of 550 nm or more and less than 650 nm.

7. The optically anisotropic body according to claim 5, wherein the membrane or film type optically anisotropic body further includes an alignment layer below the cured material or the polymer.

8. The optically anisotropic body according to claim 7, wherein the alignment layer is a rubbing alignment layer or a photo-alignment layer.

9. An optical or electronic device, including the optically anisotropic body according to claim 1.

* * * * *